United States Patent
Kim et al.

(10) Patent No.: US 8,665,775 B2
(45) Date of Patent: Mar. 4, 2014

(54) METHOD AND APPARATUS IN WHICH A RELAY STATION MAKES A HYBRID AUTOMATIC REPEAT REQUEST IN A MULTI-CARRIER SYSTEM

(75) Inventors: Hak Seong Kim, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 13/322,384

(22) PCT Filed: May 24, 2010

(86) PCT No.: PCT/KR2010/003268
§ 371 (c)(1),
(2), (4) Date: Nov. 23, 2011

(87) PCT Pub. No.: WO2010/137839
PCT Pub. Date: Dec. 2, 2010

(65) Prior Publication Data
US 2012/0093082 A1 Apr. 19, 2012

Related U.S. Application Data

(60) Provisional application No. 61/180,882, filed on May 24, 2009, provisional application No. 61/185,963, filed on Jun. 10, 2009.

(30) Foreign Application Priority Data

May 24, 2010 (KR) ........................ 10-2010-0048299

(51) Int. Cl.
*H04B 7/14* (2006.01)
*H04W 40/22* (2009.01)
(52) U.S. Cl.
USPC ............................ 370/315; 370/329; 370/279

(58) Field of Classification Search
None
See application file for complete search history.

(56) References Cited

U.S. PATENT DOCUMENTS

| | | | |
|---|---|---|---|
| 2008/0108304 A1 | 5/2008 | Suga | |
| 2008/0209299 A1 | 8/2008 | Chang et al. | |
| 2008/0209301 A1 | 8/2008 | Chang et al. | |
| 2009/0325626 A1* | 12/2009 | Palanki et al. | ............... 455/522 |
| 2010/0002619 A1 | 1/2010 | Hart et al. | |

(Continued)

FOREIGN PATENT DOCUMENTS

| | | |
|---|---|---|
| KR | 10-2008-0041570 A | 5/2008 |
| KR | 10-2008-0079155 A | 8/2008 |
| KR | 10-2008-0079567 A | 9/2008 |
| KR | 10-2009-0009977 A | 1/2009 |

*Primary Examiner* — Min Jung
(74) *Attorney, Agent, or Firm* — Birch, Stewart, Kolasch & Birch, LLP

(57) ABSTRACT

A method of performing a hybrid automatic repeat request (HARQ) of a relay station in a backhaul link of a multi-carrier system is provided. The method includes: receiving backhaul downlink data through at least one carrier between a first carrier and a second carrier; transmitting acknowledgement/not-acknowledgement (ACK/NACK) for the backhaul downlink data through an uplink component carrier; and receiving new backhaul downlink data or retransmitted backhaul downlink data in accordance with the transmitted ACK/NACK through at least one carrier between the first carrier and the second carrier, wherein the first carrier is a component carrier dedicated to the backhaul downlink between a base station and the relay station, and the second carrier is a component carrier used in both the backhaul downlink and an access downlink between the relay station and a relay user equipment at different times.

14 Claims, 25 Drawing Sheets

(56) References Cited

U.S. PATENT DOCUMENTS

| | | | |
|---|---|---|---|
| 2010/0077274 A1* | 3/2010 | Kim et al. | 714/750 |
| 2010/0080166 A1* | 4/2010 | Palanki et al. | 370/315 |
| 2010/0097978 A1* | 4/2010 | Palanki et al. | 370/315 |
| 2010/0103860 A1* | 4/2010 | Kim et al. | 370/315 |
| 2010/0265874 A1* | 10/2010 | Palanki et al. | 370/315 |
| 2010/0272006 A1* | 10/2010 | Bertrand et al. | 370/315 |
| 2011/0038284 A1* | 2/2011 | Senarath et al. | 370/279 |
| 2011/0235571 A1* | 9/2011 | Seo et al. | 370/315 |
| 2012/0033588 A1* | 2/2012 | Chung et al. | 370/280 |

\* cited by examiner

METHOD AND APPARATUS IN WHICH A RELAY STATION MAKES A HYBRID AUTOMATIC REPEAT REQUEST IN A MULTI-CARRIER SYSTEM

CROSS REFERENCE TO RELATED APPLICATIONS

This application is the National Phase of PCT/KR2010/003268 filed on May 24, 2010, which claims priority under 35 U.S.C. §119(e) to U.S. Provisional Application Nos. 61/180,882 filed on May 24, 2009, 61/185,963 filed on Jun. 10, 2009, and under 35 U.S.C. §119(a) to Patent Application No. 10-2010-0048299 filed in the Republic of Korea on May 24, 2010, all of which are hereby expressly incorporated by reference into the present application.

TECHNICAL FIELD

The present invention relates to wireless communications, and more particularly, to a method and apparatus in which a relay station performs a hybrid automatic repeat request (HARQ) in a backhaul link of a multi-carrier system.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

3rd generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A technology related to a relay station is one of main technologies for the LTE-advanced.

A relay station (RS) is a device for relaying a signal between a base station (BS) and a user equipment (UE), and is used for cell coverage extension and throughput enhancement of a wireless communication system.

Many researches for a method of transmitting a signal between the BS and the RS are currently ongoing in the wireless communication employing the RS. A conventional method of transmitting a signal between the BS and the UE has a problem when a signal is transmitted between the BS and the RS.

In the conventional method of transmitting the signal between the BS and the UE, the UE transmits the signal through one entire subframe in a time domain. One reason of transmitting the signal by the UE through the entire subframe is to set a duration of each channel for transmitting the signal to the maximum extent possible in order to reduce instantaneous maximum power consumed by the UE.

However, there is a case where the RS cannot transmit or receive a signal through one entire subframe in the time domain. In general, the RS relays a signal with respect to a plurality of UEs, which results in frequent occurrence of switching between a reception (Rx) mode and a transmission (Tx) mode. Further, the RS can receive a signal from the BS or can transmit a signal to an RS UE at the same frequency band. Alternatively, the RS can receive a signal from the RS UE or can transmit a signal to the BS at the same frequency band. The switching between the Rx mode and the Tx mode requires a specific time (hereinafter referred to as a guard time) between an Rx-mode period and a Tx-mode period. During the guard time, the RS does not transmit or receive a signal in order to avoid inter-signal interference and to provide reliable operations.

In addition, there is a subframe in which the RS must transmit an essential signal such as a primary synchronization signal (PSS), a secondary synchronization signal (SSS), and a paging message, to the RS UE connected to the RS. It is difficult for the RS to receive a signal from the BS in such a subframe. For example, in frequency division duplex (FDD), since the RS must transmit the essential signal to the RS UE in subframes having subframe indices 0, 4, 5, and 9, it is difficult to receive the signal from the BS.

Due to the aforementioned restriction, it is difficult for the RS to directly use the conventional HARQ method between the BS and the UE. The HARQ is a technique which combines automatic repeat request (ARQ) with channel coding of a physical layer to increase transmission efficiency in data processing. The ARQ is a scheme in which acknowledgement (ACK) is transmitted to a transmitter when a receiver properly receives data, and not acknowledgement (NACK) is transmitted to the transmitter when the receiver does not properly receive data. When the RS performs an HARQ in a backhaul link, there is a problem in that a subframe in which the RS receives new data or retransmitted data from the BS may overlap with a subframe in which the RS needs to transmit essential information to the RS UE.

Accordingly, in order to solve the aforementioned problems, there is a need for an HARQ method that can be used in a backhaul link between an RS and a BS.

SUMMARY OF INVENTION

Technical Problem

The present invention provides a method and apparatus of performing a hybrid automatic repeat request (HARQ) for a relay station in a backhaul link of a multi-carrier system.

Technical Solution

According to an aspect of the present invention, a method of performing a hybrid automatic repeat request (HARQ) of a relay station in a backhaul link of a multi-carrier system is provided. The method includes: receiving backhaul downlink data through at least one carrier between a first carrier and a second carrier; transmitting acknowledgement/not-acknowledgement (ACK/NACK) for the backhaul downlink data through an uplink component carrier; and receiving new backhaul downlink data or retransmitted backhaul downlink data in accordance with the transmitted ACK/NACK through at least one carrier between the first carrier and the second carrier, wherein the first carrier is a component carrier dedicated to the backhaul downlink between a base station and the relay station, and the second carrier is a component carrier used in both the backhaul downlink and an access downlink between the relay station and a relay user equipment at different times.

According to another aspect of the present invention, a method of performing an HARQ of a relay station in a backhaul link of a multi-carrier system is provided. The method includes: receiving a backhaul uplink grant through at least one carrier between a first carrier and a second carrier; transmitting backhaul uplink data through an uplink component carrier by using a radio resource allocated in the backhaul uplink grant; receiving ACK/NACK for the backhaul uplink data through at least one carrier between the first carrier and the second carrier; and transmitting the backhaul uplink data or new backhaul uplink data in accordance with the received ACK/NACK through the uplink component carrier, wherein the first carrier is a component carrier dedicated to a backhaul downlink and the second carrier is a component carrier used in both the backhaul downlink and an access downlink between the relay station and a relay user equipment at different times.

According to another aspect of the present invention, a relay station used in a multi-carrier system is provided. The relay station includes: a radio frequency (RF) unit for transmitting and receiving a radio signal; and a processor coupled to the RF unit, wherein the processor is configured for: receiving backhaul downlink data through at least one carrier between a first carrier and a second carrier; transmitting ACK/NACK for the backhaul downlink data through an uplink component carrier; and receiving new backhaul downlink data or retransmitted backhaul downlink data in accordance with the transmitted ACK/NACK through at least one carrier between the first carrier and the second carrier, wherein the first carrier is a component carrier dedicated to the backhaul downlink between a base station and the relay station, and the second carrier is a component carrier used in both the backhaul downlink and an access downlink between the relay station and a relay user equipment at different times.

Advantageous Effects

According to the present invention, a relay station can configure and use a backhaul-dedicated carrier in a multi-carrier system. Unlike a carrier used in a backhaul link and an access link in a time division multiplexing (TDM) manner, the backhaul-dedicated carrier can receive a signal from a base station in all subframes. By using the backhaul-dedicated carrier, the relay station can perform a hybrid automatic repeat request (HARQ) of the backhaul link while maintaining the same period with the HARQ performed between the base station and a user equipment.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the 3GPP LTE/LTE-A. However, technical features of the present invention are not limited thereto.

Figure 1:
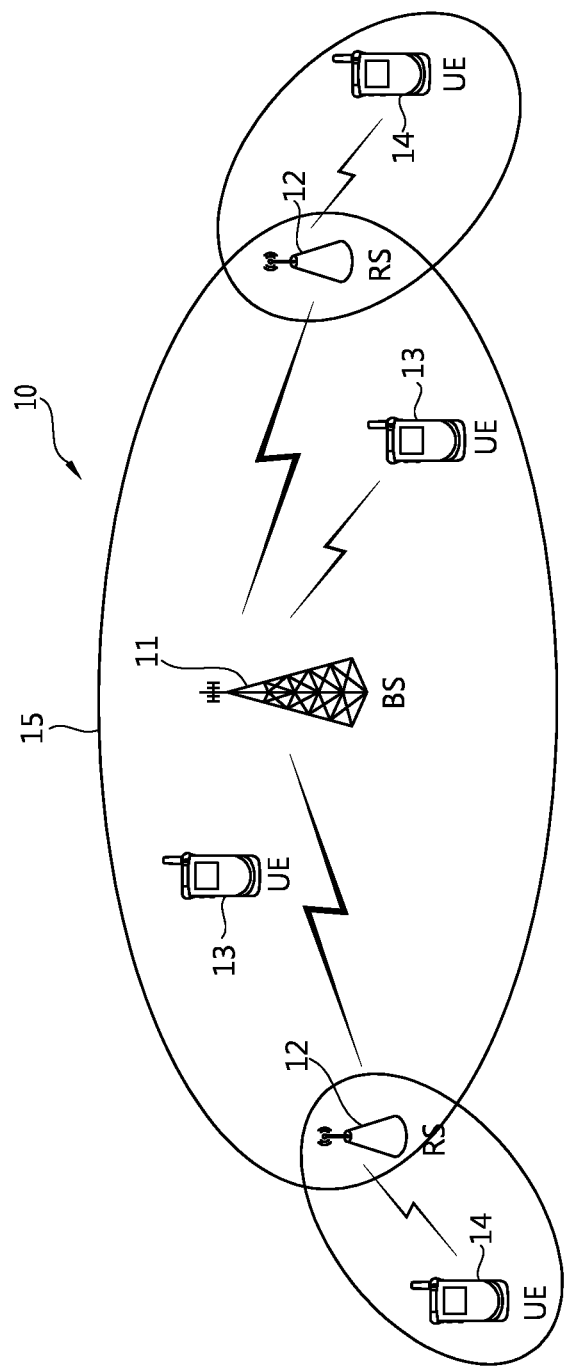
FIG. 1 shows a wireless communication system employing a relay station.

FIG. 1 shows a wireless communication system employing a relay station (RS).

Referring to FIG. 1, a wireless communication system 10 employing an RS includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is also referred to as another terminology such as a relay node (RN), a repeater, a relay, etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma UE) 13 denotes a UE that directly communicates with the BS 11, and a relay station UE (or RS UE) 14 denotes a UE that communicates with the RS. Even if the Ma UE 13 exists in a cell of the BS 11, the Ma UE 13 can communicate with the BS 11 via the RS 12 to improve a data transfer rate depending on a diversity effect.

Hereinafter, a link between the BS 11 and the Ma UE 13 is referred to as a macro link. The macro link can be divided into a macro downlink (M-DL) and a macro uplink (M-UL). The M-DL denotes communication from the BS 11 to the Ma UE 13. The M-UL denotes communication from the Ma UE 13 to the BS 11.

The link between the BS 11 and the RS 12 is referred to as a backhaul link. The backhaul link can be divided into a backhaul downlink (B-DL) and a backhaul uplink (B-UL). The B-DL denotes communication from the BS 11 to the RS 12. The B-UL denotes communication from the RS 12 to the BS 11.

A link between the RS 12 to the RS UE 14 is referred to as an access link. The access link can be divided into an access downlink (A-DL) and an access uplink (A-UL). The A-DL denotes communication from the RS 12 to the RS UE 14. The A-UL denotes communication from the RS UE 14 to the RS 12.

The wireless communication system 10 employing the RS is a system supporting bidirectional communication. The bidirectional communication may be performed by using a time division duplex (TDD) mode, a frequency division duplex (FDD) mode, etc. When in the TDD mode, different time resources are used in UL transmission and DL transmission. When in the FDD mode, different frequency resources are used in UL transmission and DL transmission.

Figure 2:
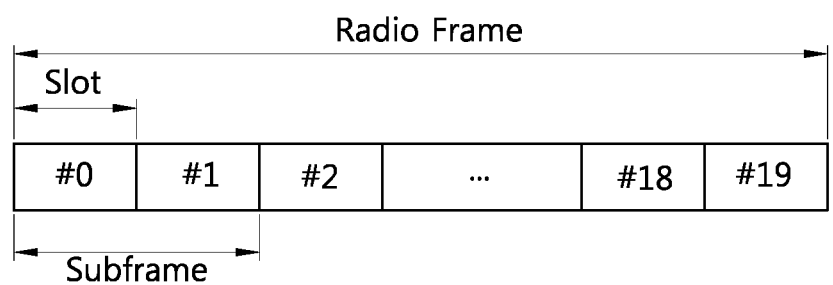
FIG. 2 shows a radio frame structure of $3^{rd}$ generation partnership project (3GPP) long term evolution (LTE).

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol period, and can be referred to as other terms. For example, the OFDM symbol can also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0 (2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously. Hereinafter, a symbol may imply one OFDM symbol or one SC-FDMA symbol.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 2.

Figure 3:
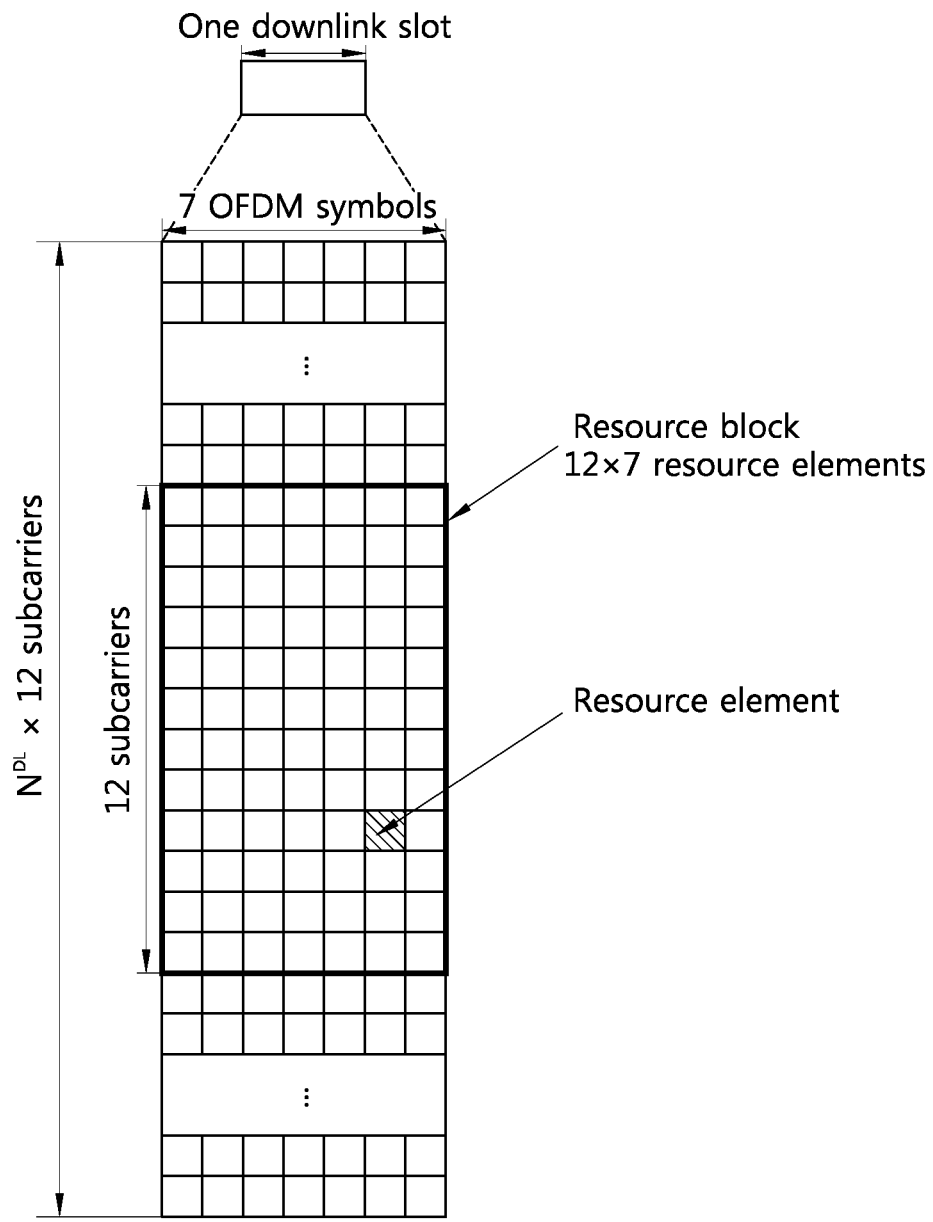
FIG. 3 shows an example of a resource grid for one downlink (DL) slot.

FIG. 3 shows an example of a resource grid for one DL slot.

In FDD and TDD radio frames, one slot includes a plurality of OFDM symbols in a time domain and a plurality of resource blocks (RBs) in a frequency domain. The RB is a resource allocation unit, and includes a plurality of consecutive subcarriers in one slot.

Referring to FIG. 3, one DL slot includes 7 OFDM symbols and one RB includes 12 subcarriers in the frequency domain for exemplary purposes only, but the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the DL slot depends on a DL transmission bandwidth determined in a cell. The resource grid described in FIG. 3 can also apply to UL transmission.

Figure 4:
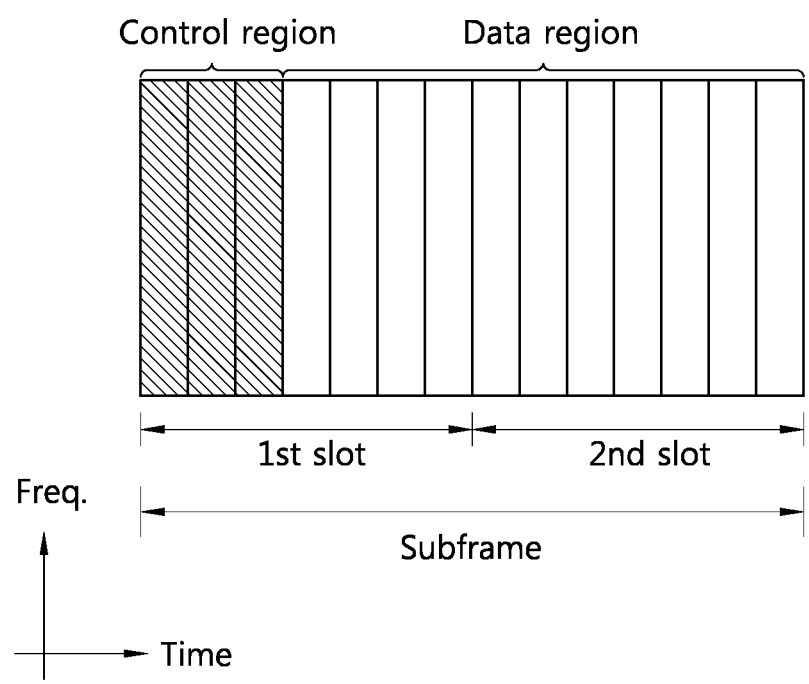
FIG. 4 shows a structure of a DL subframe.

FIG. 4 shows a structure of a DL subframe.

Referring to FIG. 4, the subframe includes two consecutive slots. A maximum of three OFDM symbols located in a front portion of a $1^{st}$ slot within the subframe correspond to a control region to be assigned with a physical downlink control channel (PDCCH). The remaining OFDM symbols correspond to a data region to be assigned with a physical downlink shared channel (PDSCH). In addition to the PDCCH, control channels such as a physical control format indicator channel (PCFICH), a physical hybrid automatic repeat request (HARQ) indicator channel (PHICH), etc., can be assigned to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region The number of OFDM symbols included in the control region of the subframe can be known by using the PCFICH. The PHICH carries information indicating whether UL data transmitted by the UE is successfully received.

The control region consists of a plurality of control channel elements (CCEs) that is a logical CCE stream. Hereinafter, the CCE stream denotes a set of all CCEs constituting the control region in one subframe. The CCE corresponds to a plurality of resource element groups. For example, the CCE may correspond to 9 resource element groups. The resource element group is used to define mapping of a control channel onto a resource element. For example, one resource element group may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of $\{1, 2, 4, 8\}$.

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 5:
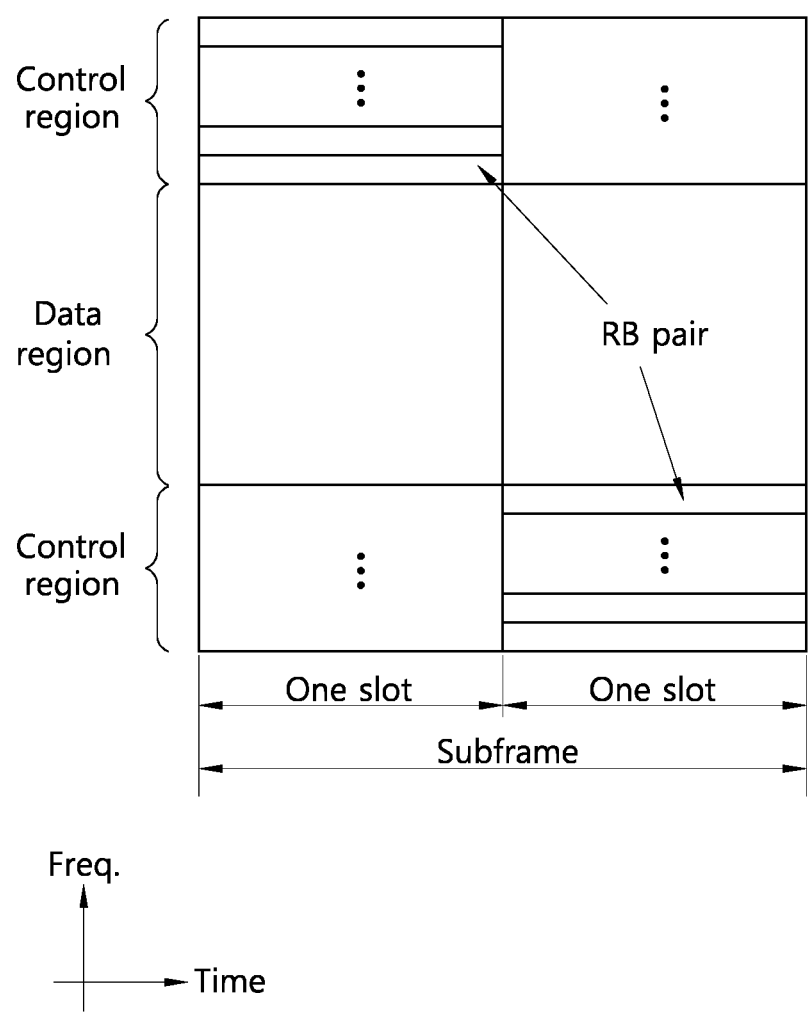
FIG. 5 shows an uplink (UL) subframe structure.

FIG. 5 shows a UL subframe structure.

Referring to FIG. 5, a UL subframe can be divided into a control region and a data region. The control region is a region where a physical uplink control channel (PUCCH) for carrying UL control information is allocated. The data region is a region where a physical uplink shared channel (PUSCH) for carrying user data is allocated.

The PUCCH for one UE is allocated in a pair of RBs 51 and 52. The RBs 51 and 52 belonging to the RB pair occupy different subcarriers in each of two slots. This is called that the RB pair allocated to the PUCCH is frequency-hopped in a slot boundary.

The PUCCH can support multiple formats. That is, UL control information having a different number of bits for each subframe can be transmitted according to a modulation scheme. For example, when using a binary phase shift keying (BPSK) (i.e., a PUCCH format 1a), 1-bit UL control information can be transmitted over the PUCCH, and when using quadrature phase shift keying (QPSK) (i.e., a PUCCH format 1b), 2-bit UL control information can be transmitted over the PUCCH. In addition thereto, examples of the PUCCH format include a format 1, a format 2, a format 2a, a format 2b, etc. For this, the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

Now, a multi-carrier system will be described.

The conventional 3GPP LTE system supports a case where a DL bandwidth is set differently from a UL bandwidth under the assumption that one carrier is used. That is, it implies that the 3GPP LTE is supported only when the DL bandwidth is equal to or different from the UL bandwidth in a condition where one carrier is defined for each of a DL and a UL. For example, the 3GPP LTE system can support up to 20 MHz, and the UL bandwidth and the DL bandwidth may be different from each other, but in this case, only one carrier is supported for the UL and the DL.

On the other hand, the multi-carrier system supports carrier aggregation. The carrier aggregation implies that a broadband can be configured by aggregating a plurality of narrowband component carriers (CCs). The carrier aggregation can support a throughput that increases by extension of a transmission bandwidth, prevent a cost increase caused by using a broadband radio frequency (RF) element, and ensure compatibility with legacy systems. For example, the extension of the transmission bandwidth can support a bandwidth of up to 100 MHz by aggregating 5 CCs having a bandwidth of 20 MHz.

The carrier aggregation can be classified in a frequency domain into contiguous carrier aggregation which is achieved between contiguous carriers and non-contiguous carrier aggregation which is achieved between non-contiguous carriers. The non-contiguous carrier aggregation is also referred to as spectrum aggregation.

CCs used in carrier aggregation may have the same bandwidth or may have different bandwidths. For example, two 20 MHz CCs can be used to configure a 40 MHz band. Alternatively, one 20 MHz CC and two 10 MHz CCs can be used to configure the 40 MHz band.

In addition, a total bandwidth used in a UL and a total bandwidth used in a DL may be equal to each other or may be different from each other. For example, a total bandwidth of 60 MHz may be used by using three 20 MHz CCs in the UL, and a total bandwidth of 100 MHZ may be used by using five 20 MHz CCs in the DL. Hereinafter, a multiple carrier system refers to a system capable of supporting a plurality of carriers on the basis of carrier aggregation.

Figure 6:
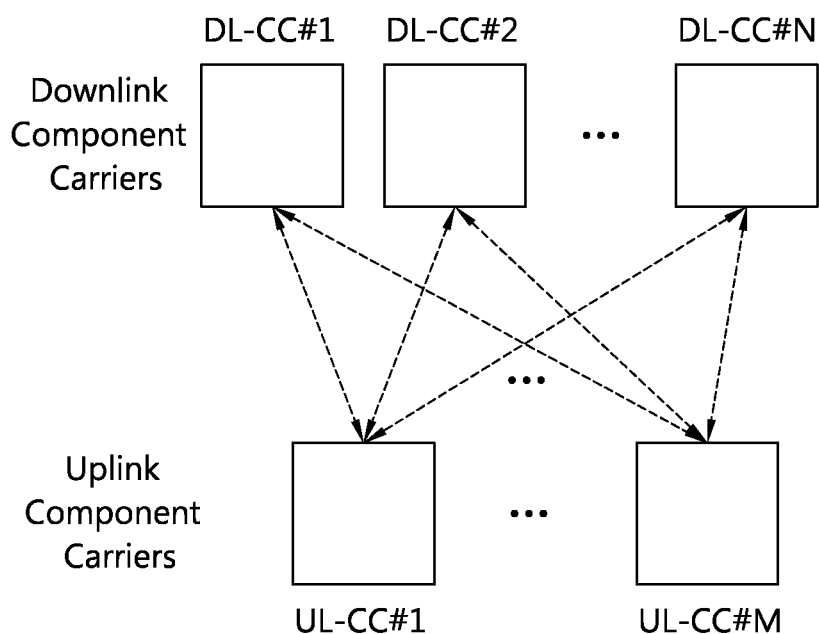
FIG. 6 shows a component carrier (CC) used in a multi-carrier system.

FIG. 6 shows a CC used in a multi-carrier system.

In FIG. 6, a DL-CC#1 to a DL-CC#N (where N is a natural number) indicate DL CCs, and a UL-CC#1 to a UL-CC#M (where M is a natural number) denote UL CCs. A frequency band of each CC may have various values. For example, the frequency band may have a value of 10 MHz or 20 MHz. The values N and M may be identical to each other or may be different from each other. It is assumed hereinafter that N is greater than M. The DL CCs and the UL CCs can be used in a backhaul link between a BS and an RS.

Figure 7:
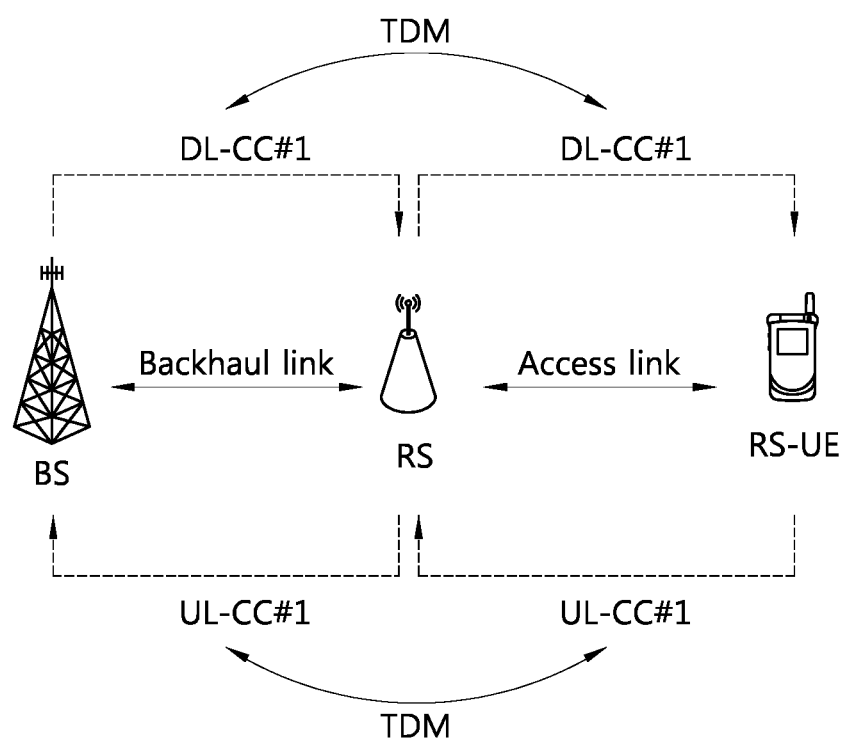
FIG. 7 shows an example of the conventional method of operating a backhaul link and an access link when employing a relay station.

FIG. 7 shows an example of the conventional method of operating a backhaul link and an access link when employing an RS.

Referring to FIG. 7, in a link between a BS and the RS and a link between the RS and an RS UE, a DL-CC#1 is used at a different time and cannot be used at the same time. That is, in a B-DL and an A-DL, one carrier operates in a time division multiplexing (TDM) manner.

In addition, in the link between the BS and the RS and the link between the RS and the RS UE, a UL-CC#1 is used at a different time and cannot be used at the same time. That is, in a B-UL and an A-UL, one carrier operates in the TDM manner.

Such a conventional method has a problem in that there is a subframe in which the RS cannot receive a signal from the BS. For example, in a 3GPP LTE FDD system, the RS cannot receive a signal from the BS in subframes 0, 4, 5, and 9. This is because the RS has to transmit an essential signal such as a primary synchronization signal (PSS), a secondary synchronization signal (SSS), and a paging message, to the UE.

When an HARQ is applied in frequency division duplex (FDD), the UE transmits ACK/NACK in a subframe n with respect to data received in a subframe n−4. In addition, new data or retransmission data is received in a subframe (n+4) in accordance with the ACK/NACK. When such an HARQ method is directly applied to the RS, this may be a problematic since there is a subframe in which the RS cannot receive data from the BS.

Figure 8:
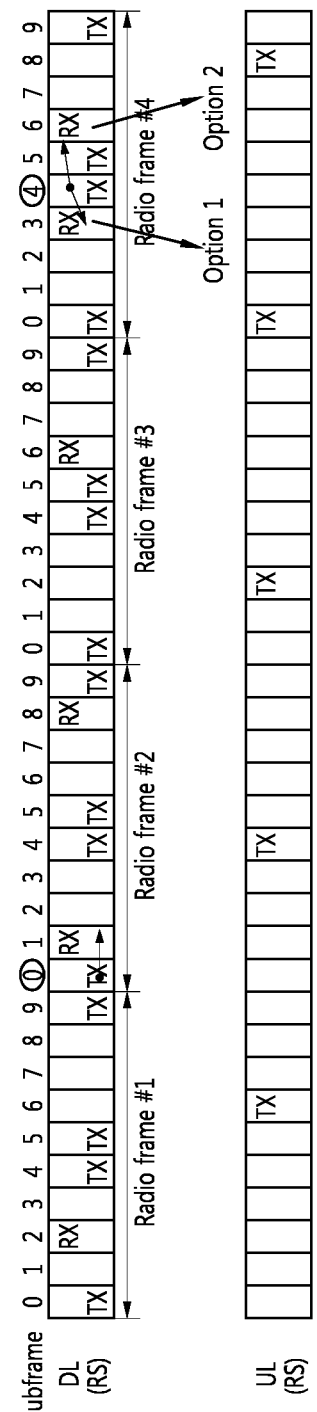
FIG. 8 shows a subframe not capable of receiving a signal from a base station when a relay station performs a hybrid automatic repeat request (HARQ) and another subframe capable of receiving a signal in replacement of the subframe not capable of receiving the signal.

FIG. 8 shows a subframe not capable of receiving a signal from a BS when an RS performs an HARQ and another subframe capable of receiving a signal in replacement of the subframe not capable of receiving the signal.

In FIG. 8, subframe indices of each radio frame are indicated from 0 to 9. The RS can receive B-DL data in a subframe 6 of a DL radio frame #3. Then, the RS can transmit ACK/NACK for the B-DL data in a subframe 0 of a UL radio frame #4. The RS must receive new B-DL data or retransmission B-DL data in accordance with the ACK/NACK in a subframe 4 of a DL radio frame #4. As described above, in case of FDD, there is a restriction in that the RS cannot receive a signal of the BS in subframes 0, 4, 5, and 9. Therefore, the RS can receive B-DL data in a subframe 3 (option 1) which is a subframe capable of receiving a signal before the subframe 4 or in a subframe 6 (option 2) which is a subframe capable of receiving a signal after the subframe 4.

Figure 9:
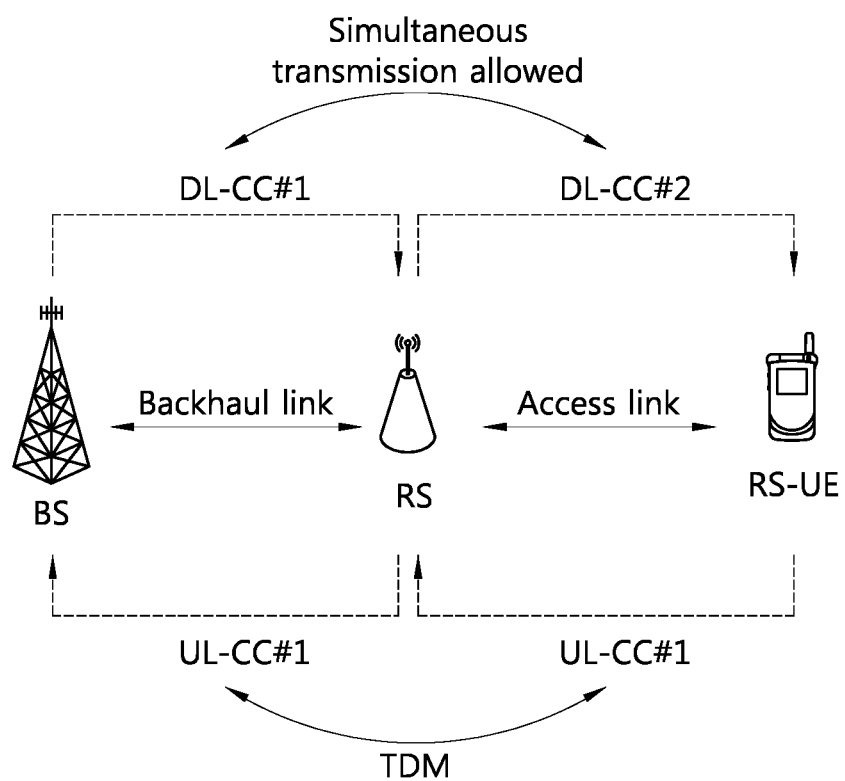
FIG. 9 shows a first embodiment of a carrier operation method in a backhaul link when using a plurality of DL CCs and one UL CC.

FIG. 9 shows a first embodiment of a carrier operation method in a backhaul link when using a plurality of DL CCs and one UL CC.

When the plurality of DL CCs can be used in a wireless communication system, some DL CCs can be used in a B-DL and the remaining DL CCs can be used in an A-DL. The UL CC can be used in a B-UL and an A-UL in a TDM manner.

For example, when there are two available DL CCs (i.e., DL-CC#1 and DL-CC#2), one DL CC (i.e., DL-CC#1) can be used in the B-DL, and the other DL CC (i.e., DL-CC#2) can be used in the A-DL. In this case, the DL-CC#1 and the DL-CC#2 may be different frequency bands. Then, the DL-CC#1 and the DL-CC#2 can be used simultaneously. Therefore, an RS can receive a signal from a BS even in subframes having subframe indices 0, 4, 5, and 9, and A-DL transmission is possible in all subframes.

In the DL-CC#1 used in the B-DL, a DL grant for B-DL transmission or a UL grant for B-UL transmission can be transmitted. In this case, the DL grant or the UL grant can be transmitted by using a channel having the same format as a PDCCH used between a BS and a UE. Alternatively, the DL grant or the UL grant can be transmitted through an R-PDCCH. Herein, the R-PDCCH implies a PDCCH defined when a half-duplex (HD) RS, which is not allowed to simultaneously transmit and receive signals at the same frequency band, receives a signal from the BS. The R-PDCCH can be applied to a subframe having a smaller number of available OFDM symbols in comparison with a subframe in which a DL signal is transmitted from the BS to the UE. Hereinafter, the DL grant or the UL grant can be transmitted through the PDCCH or the R-PDCCH, and a specific channel format by which transmission is performed can be reported to the RS through higher-layer signaling (e.g., radio resource control (RRC)) or can be predetermined.

Figure 10:
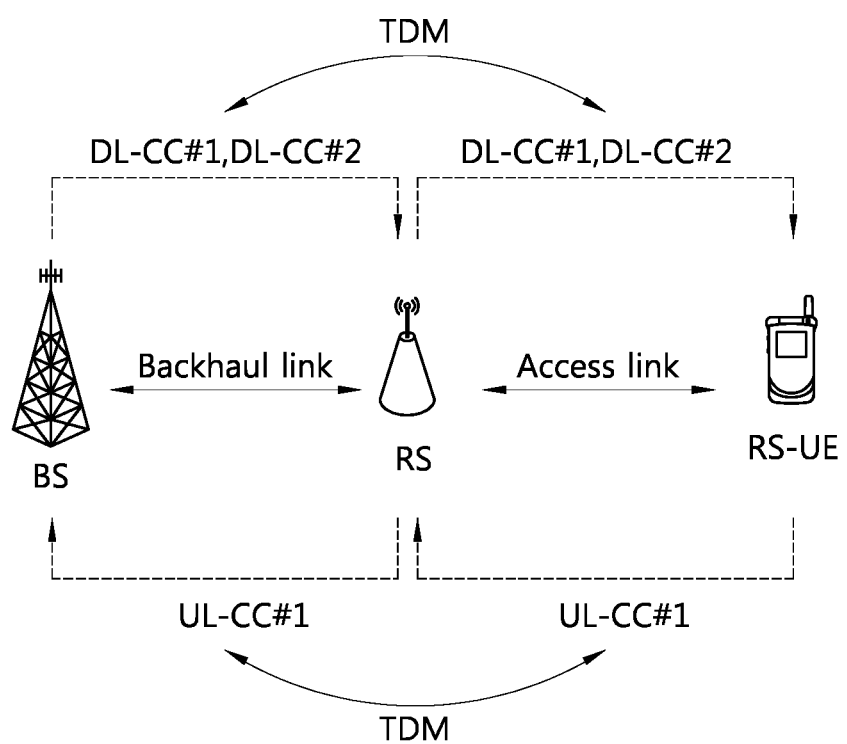
FIG. 10 shows a second embodiment of a carrier operation method in a backhaul link when using a plurality of DL CCs and one UL CC.

FIG. 10 shows a second embodiment of a carrier operation method in a backhaul link when using a plurality of DL CCs and one UL CC.

Referring to FIG. 10, when there is a plurality of DL CCs that can be used in a wireless communication system, all of the plurality of DL CCs are used in a B-DL and an A-DL, and in this case, the DL CCs are used in the B-DL and the A-DL in a TDM manner. The UL CC can be used in a B-UL and an A-UL in the TDM manner. In this method, subframes having subframe indices 0, 4, 5, and 9 cannot be used when an RS receives a signal from a BS.

The RS can receive B-DL data from two DL CCs, and in this case, there is a problem in that ACK/NACK for the B-DL data has to be transmitted through one UL CC. To solve this problem, the RS can perform bundling or multiplexing the ACK/NACK for the B-DL data transmitted from a plurality of DL CCs and then can transmit the resultant ACK/NACK by using one UL CC.

For convenience of explanation, it is assumed in the figures described below that the number of DL subframes that can be used in a backhaul link is equal to the number of UL subframes (when each subframe is based on one CC). BH n (when n is a natural number) denotes a backhaul link HARQ process n. n denotes a backhaul link HARQ process number. For example, BH1 denotes a backhaul link HARQ process 1. According to subframe allocation, the HARQ process number may not be one-to-one mapped to a subframe index. That is, when the number of DL subframes is great and the number of UL subframes is small, since a DL:UL ratio is different, the backhaul link HARQ process number may not have a constant subframe spacing and a fixed value as shown in the figures described below.

In particular, if the number of UL subframes is small, B-UL ACK/NACK for B-DL data transmitted in a DL subframe can be transmitted in a first upcoming available UL subframe. In this case, a plurality of DL subframes can correspond to the UL subframe, and there is a need for a method for transmitting a plurality of B-UL ACK/NACKs. As an example of such a method, ACK/NACK bundling or ACK/NACK multiplexing/channel selection or the like can be used.

RX indicated in a subframe of DL-CC implies that the RS receives a B-DL signal from the BS, and TX indicated therein implies that the RS transmits an A-DL signal to an RS UE. TX indicated in a subframe of UL-CC implies that the RS transmits a B-UL signal to the BS, and RX indicated therein implies that the RS receives an A-UL signal from the RS UE. 'A' indicated in a subframe implies that a radio resource is unused in a backhaul link and can be used only in an access link.

Although it is described in some figures that whether a subframe is used in the backhaul link or the access link is designated with respect to all subframes, it does not mean that all of the subframes are used. That is, only some subframes may be used by being allocated to the backhaul link or the access link. This implies that the number of allocated subframes may vary depending on a load of the backhaul link or the access link. That is, optionally, only 'A1' and 'BH1' can be defined.

Although a subframe index can be assigned in sequence from 0 to 9 in one frame, for convenience of explanation, subframe indices of contiguous frames are indicated sequentially in the figures described below.

Figure 11:
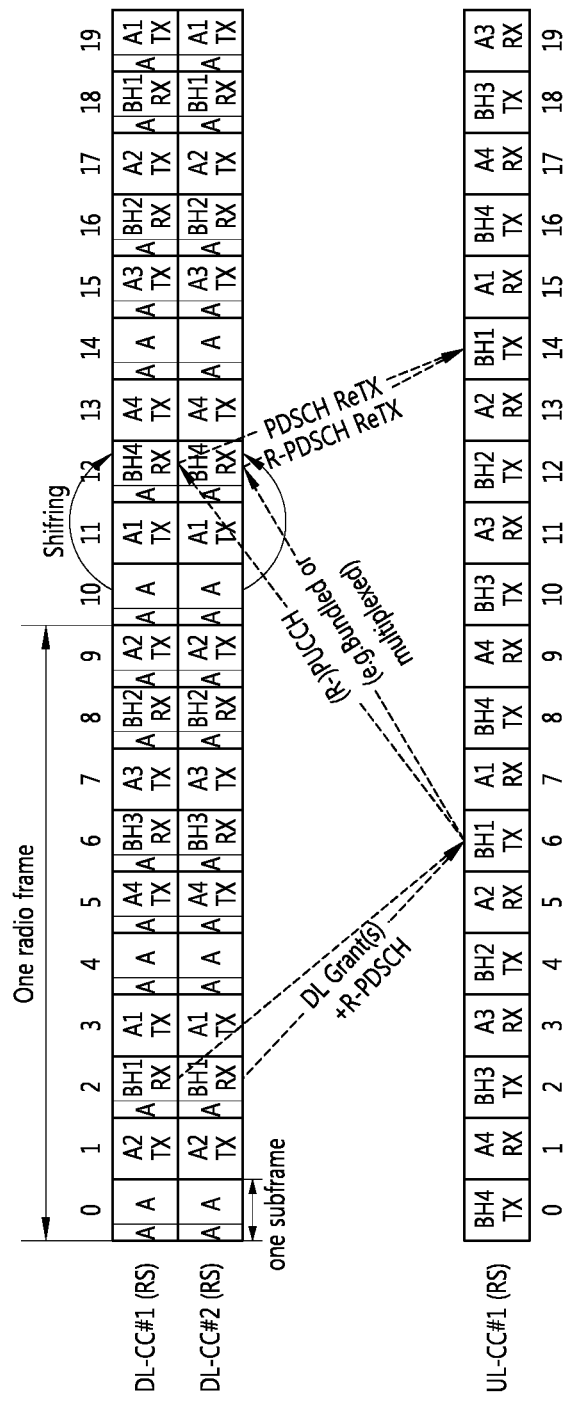
FIG. 11 and FIG. 12 show a method of performing an HARQ by using a carrier operation method described with reference to FIG. 10.
Figure 12:
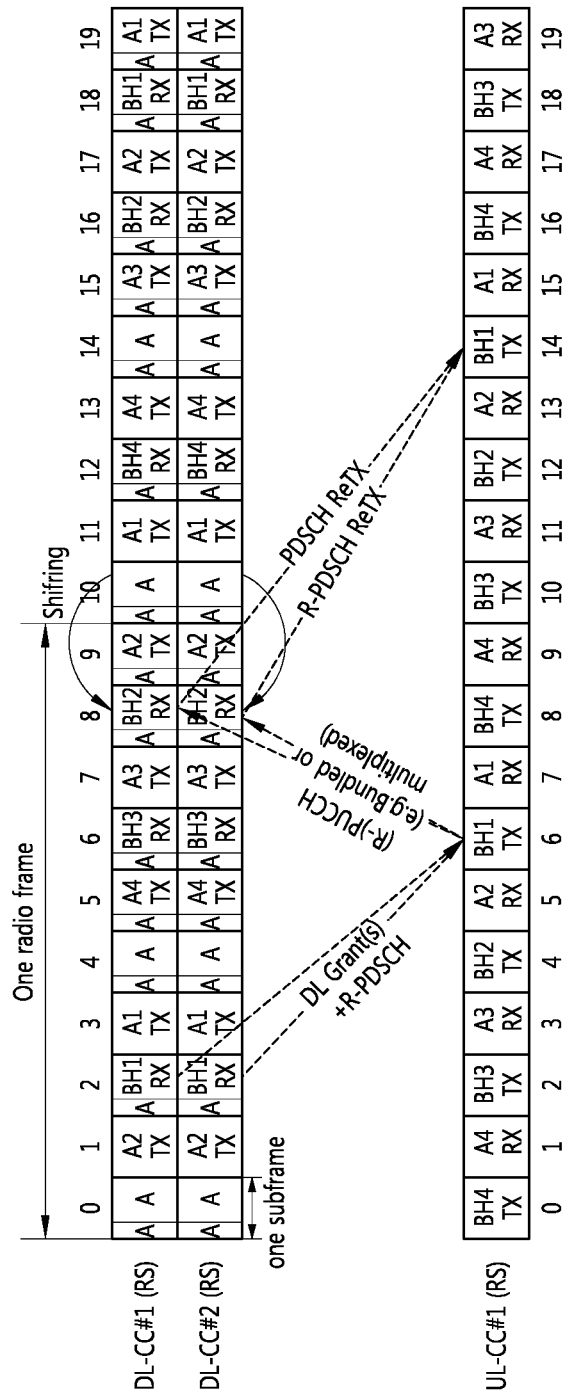

FIG. 11 and FIG. 12 show a method of performing an HARQ by using the carrier operation method described with reference to FIG. 10.

Referring to FIG. 11 and FIG. 12, a backhaul link HARQ process (hereinafter, an HARQ process) is aligned in a DL-CC#1 and a DL-CC#2. That is, the same HARQ process is performed in a subframe of each DL CC having the same subframe index.

Referring to FIG. 11 and FIG. 12, an RS receives B-DL data and a DL grant for a BH1 (i.e., HARQ process 1) in a subframe 2 of the DL-CC#1 and a subframe 2 of the DL-CC#2. In the subframe 2, the B-DL data is transmitted from a BS through an R-PDSCH. The R-PDSCH implies a PDSCH used when the BS transmits data to the RS.

In this case, the RS transmits ACK/NACK for the B-DL data received through the DL-CC#1 and the DL-CC#2 in a subframe 6 by performing bundling or multiplexing. The ACK/NACK can be transmitted through the R-PUCCH in which the RS transmits a UL signal to the BS. The R-PUCCH may have a smaller number of available SC-FDMA symbols in comparison with a PUCCH in which a UE transmits a UL signal to the BS. In addition, R-PUCCH information can be transmitted always through the R-PUSCH. That is, B-UL ACK/NACK for B-DL transmission is transmitted always through the R-PUSCH. There is a high possibility that a DL subframe and a UL subframe used in the backhaul link is a subframe in which data is transmitted. Therefore, the B-UL ACK/NACK can be transmitted always through the R-PUSCH under the assumption that there is a high possibility that the R-PUSCH exists always in the UL subframe in which the B-UL ACK/NACK is transmitted for the B-DL transmission. There is a possible method in which an R-PUSCH to which no data is allocated is compulsively scheduled if the R-PUSCH does not exist and B-UL ACK/NACK is transmitted through the R-PUSCH. Hereinafter, it is assumed that ACK/NACK is transmitted between the BS and the RS in a backhaul link, and implies B-UL ACK/NACK or B-DL ACK/NACK.

When using bundling, for example, when B-DL data transmitted in the DL-CC#1 and B-DL data transmitted in the DL-CC#2 are both successfully received, '1' can be transmitted, and otherwise, '0' can be transmitted. Upon receiving '1', the BS can know that B-DL data transmitted in two DL-CCs is all successfully received. Upon receiving '0', there is no way to know a specific DL-CC which fails in reception, and thus B-DL data can be retransmitted in all DL-CCs.

When using a multiplexing scheme, ACK/NACK for each DL-CC is transmitted by using a different resource. Therefore, the BS can know whether the RS successfully receives B-DL data transmitted in each DL-CC. Although an amount of radio resources used in ACK/NACK transmission increases in comparison with a case of using a bundling scheme, the multiplexing scheme has an advantage in that it is possible to know whether B-DL data is received in each DL-CC. The BS can retransmit B-DL data only for a DL-CC in which NACK is received.

The RS can receive new B-DL data or retransmitted B-DL data in accordance with ACK/NACK. In this case, a collision may occur such that a subframe in which the new B-DL data or the retransmitted B-DL data is received overlaps with a subframe in which essential information must be transmitted to an RS UE. When the collision occurs, the BS can shift a transmission time point of data and thus can transmit the data in a next subframe (i.e., a subframe 12) capable of receiving data as shown in FIG. 11 or in a previously subframe (i.e., a subframe 8) capable of receiving data as shown in FIG. 12.

Figure 13:
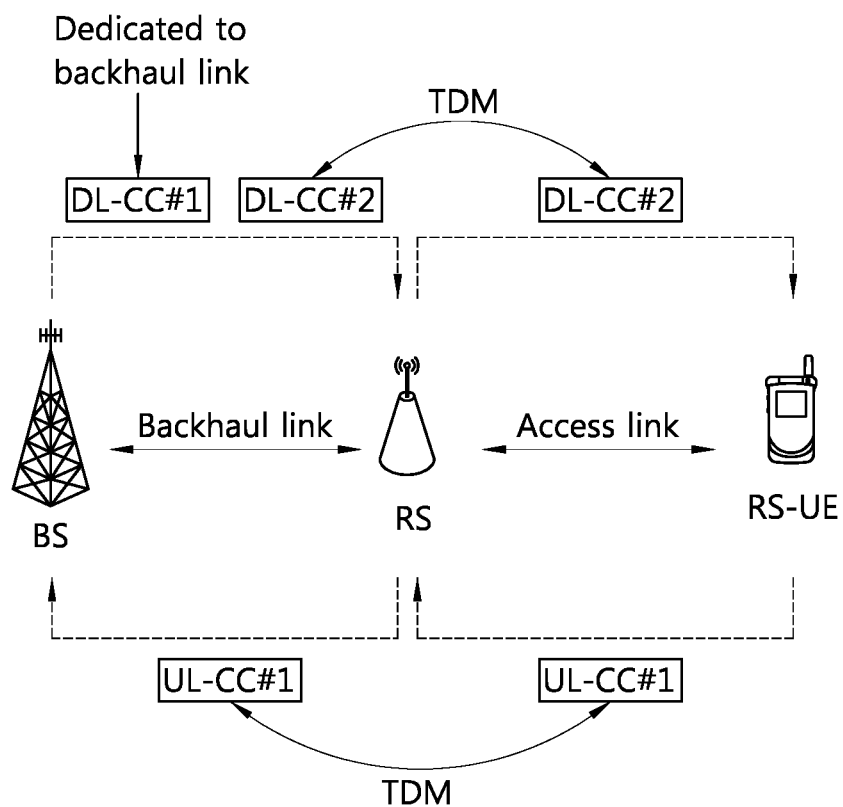
FIG. 13 shows a third embodiment of a carrier operation method in a backhaul link when using a plurality of DL CCs and one UL CC.

FIG. 13 shows a third embodiment of a carrier operation method in a backhaul link when using a plurality of DL CCs and one UL CC.

Referring to FIG. 13, when there is a plurality of DL CCs that can be used in a wireless communication system, at least one of the plurality of DL CCs can be dedicated to a B-DL and the remaining DL CCs can be used in the B-DL and an A-DL in a TDM manner. The UL CC can be used in a B-UL and an A-UL in the TDM manner.

For example, if there are two DL CCs (i.e., DL-CC#1 and DL-CC#2) and one UL CC (i.e., UL-CC#1), then the DL-CC#1, the DL-CC#2, and the UL-CC#1 may have different frequency bands. In this case, the DL-CC#1 may be dedicated to the B-DL, and the DL-CC#2 may be dedicated to the B-DL and the A-DL in the TDM manner. When using such a carrier operation method, the RS can receive B-DL data in any subframe through the DL-CC#1. On the other hand, there is a subframe in which the B-DL data cannot be received through the DL-CC#2.

To solve this problem, when the RS performs an HARQ in the backhaul link, a subframe that can be used in a backhaul link and a subframe that can be used in an access link can be used in a distinctive manner for the DL-CC#2 and the UL-CC#1. For example, a subframe of which a subframe index is an even number can be allocated to the backhaul link, and a subframe of which a subframe index is an odd number can be allocated to the access link. However, this is for exemplary purposes only, and thus the subframes can be distinguished in a different manner. In a subframe in which a signal cannot be received from the BS in DL-CC#2, the RS can perform the HARQ by receiving the signal from the BS through the DL-CC#1.

Figure 14:
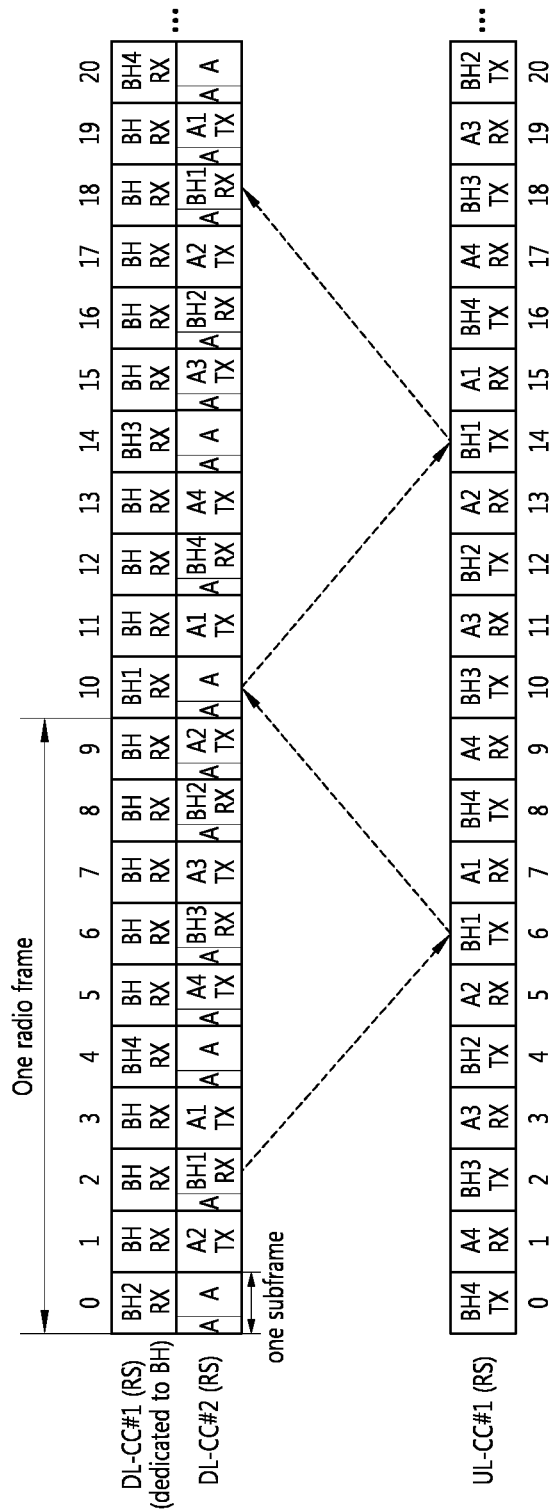
FIG. 14 shows an operation in a subframe of each carrier when a DL CC operated in a time division multiplexing (TDM) manner is used as a primary carrier in a third embodiment.

FIG. 14 shows an operation in a subframe of each carrier when a DL CC operated in a TDM manner is used as a primary carrier in the third embodiment.

In FIG. 14, a DL-CC#2 is distinguished from a DL-CC#1 dedicated only to a backhaul link in a sense that the DL-CC#2 is a DL CC that can be used in both a B-DL and an A-DL in a TDM manner. In this case, the DL-CC#2 can be used as a primary carrier when data is received in the B-DL, and the DL-CC#1 can be secondarily used when B-DL data cannot be used in the DL-CC#2. That is, although the RS can receive a signal from the BS in all subframes of the DL-CC#1, it is used secondarily.

A subframe constituting a radio frame can be divided into a subframe having an odd index and a subframe having an even index. In this case, for example, the subframe having the odd index (e.g., subframes 1, 3, 5, etc.) can be used in the A-DL, and the subframe having the even index (i.e., subframes 0, 2, 4, etc.) can be used in the B-DL.

It is assumed hereinafter that an HARQ period is 8 subframes in the backhaul link and the access link.

Figure 15:
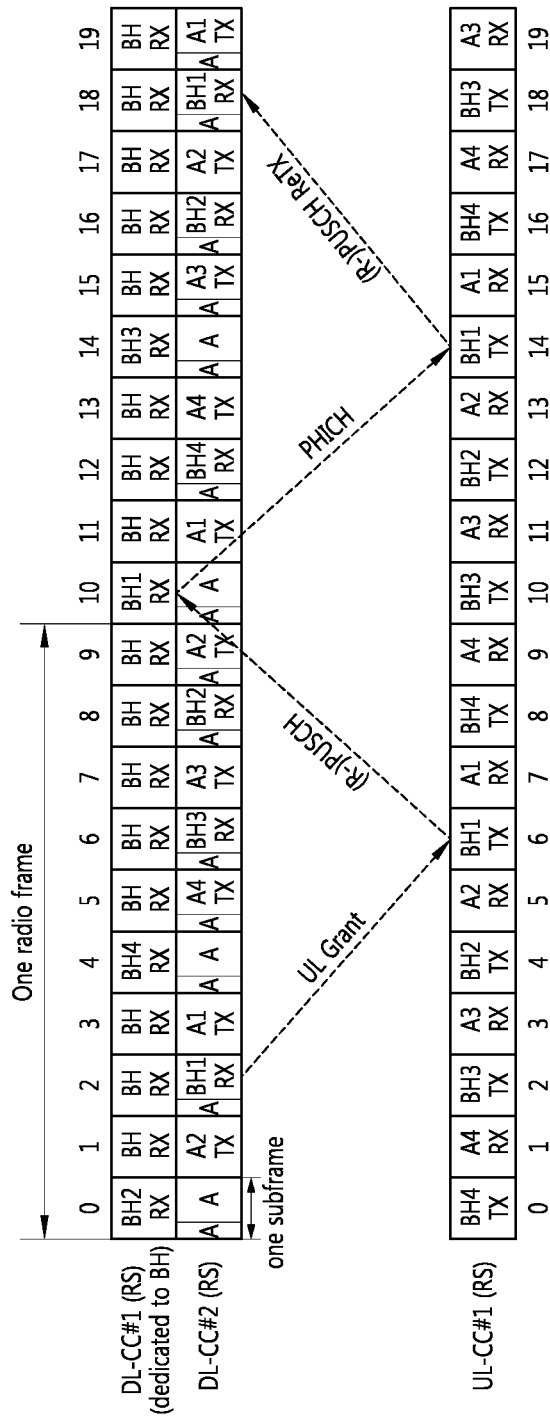
FIG. 15 shows a method of performing a backhaul uplink (B-UL) HARQ in a third embodiment.

FIG. 15 shows a method of performing a B-UL HARQ in the third embodiment.

Referring to FIG. 15, an RS can receive a UL grant for an HARQ process 1 from a BS in a subframe 2 of a DL-CC#2 for example. The RS transmits B-UL data for the HARQ process 1 in a subframe 6 of a UL-CC#1. The BS transmits ACK/NACK for the B-UL data not in a subframe 10 of a DL-CC#2 but in a subframe 10 of the DL-CC#1. This is because a B-DL signal cannot be received from the BS since the RS must transmit essential information to an RS UE in a subframe of the DL-CC#2. Since the DL-CC#1 is a CC dedicated to a B-DL and has a frequency band different from that of the DL-CC#2, the RS can receive ACK/NACK transmitted by the BS in the subframe 10 of DL-CC#1. The BS can transmit the ACK/NACK through a PHICH included in the subframe 10 of the DL-CC#1. The RS can retransmit B-UL data for the HARQ process 1 in a subframe 14 of the UL-CC#1 or can transmit new B-UL data. Likewise, an HARQ process 3 (i.e., BH3) is also performed.

In the subsequent figures of FIG. 15, the PHICH is used for not only a channel for transmission of ACK/NACK but also its equivalent channel. For example, a UL grant in which a new data indicator (NDI) is not toggled can take a role of the ACK/NACK of the PHICH.

Figure 16:
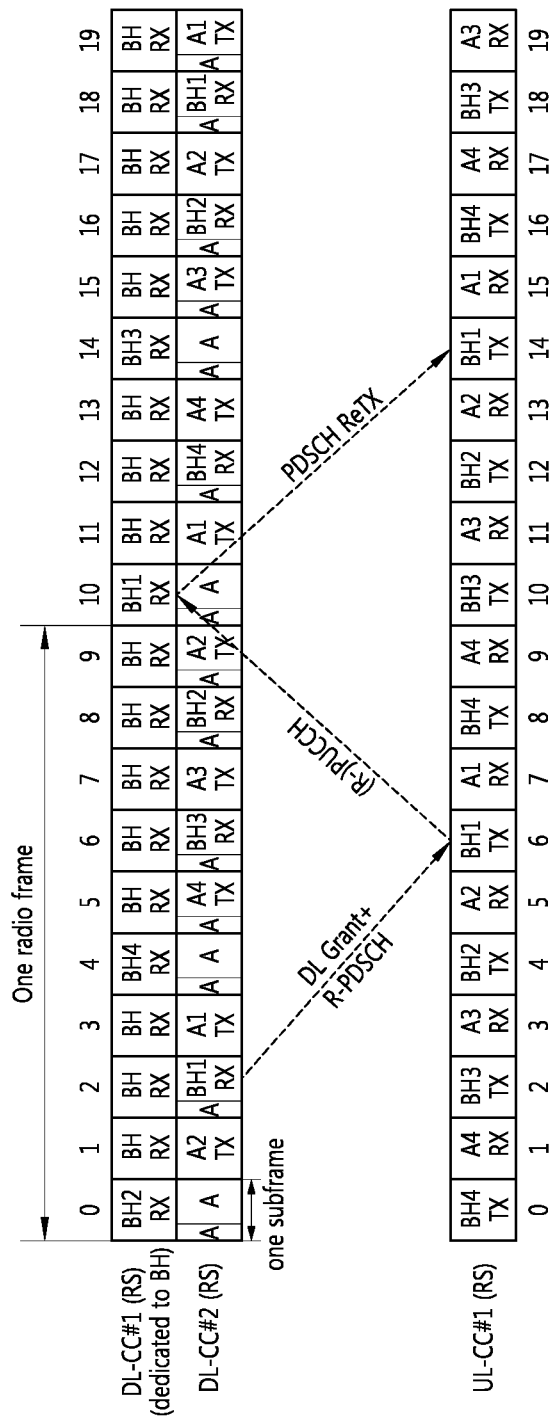
FIG. 16 shows a method of performing a backhaul downlink (B-DL) HARQ in a third embodiment.

FIG. 16 shows a method of performing a B-DL HARQ in the third embodiment.

Referring to FIG. 16, in a subframe 2 of a DL-CC#2, an RS receives a DL grant and B-DL data through a radio resource indicated by the DL grant. The RS transmits ACK/NACK for the B-DL data to a BS in a subframe 6 of a UL-CC#1. The BS transmits new B-DL data in accordance with the ACK/NACK or retransmits B-DL data not in a subframe 10 of the DL-CC#2 but in a subframe 10 of a DL-CC#1. In this case, the BS can use the same format as a PDSCH used when transmitting a signal to a UE in the DL-CC#1. This is because the DL-CC#1 does not require a guard time for switching of transmission and reception unlike in the DL-CC#2.

In the above example, it is possible for the BS to transmit B-DL data by using both of the DL-CC#1 and the DL-CC#2. For example, the BS can transmit the B-DL data simultaneously through a subframe 1, 2 of the DL-CC#1 and a subframe 2 of the DL-CC#2. The RS can transmit ACK/NACK for the B-DL data received from a plurality of subframes (belonging to different DL CCs) by the use of one UL CC by performing bundling or multiplexing. In this case, the bundling can be performed in a unit of 2 subframes. This is because the subframe allocated to the access link and the backhaul link is divided into the subframe having the odd or even subframe index.

Further, it shall be designed such that not only B-DL data transmitted in the subframe 1 and 2 of the DL-CC#1 but also B-DL data transmitted in the subframe 2 of the DL-CC#2 can be retransmitted in a subframe 9 or 10 of the DL-CC#1.

Hereinafter, a method of performing an HARQ in a backhaul link is described when a backhaul-dedicated DL carrier is used as a primary carrier and a DL carrier used in a B-DL and an A-DL in a TDM manner is used as a secondary carrier.

Figure 17:
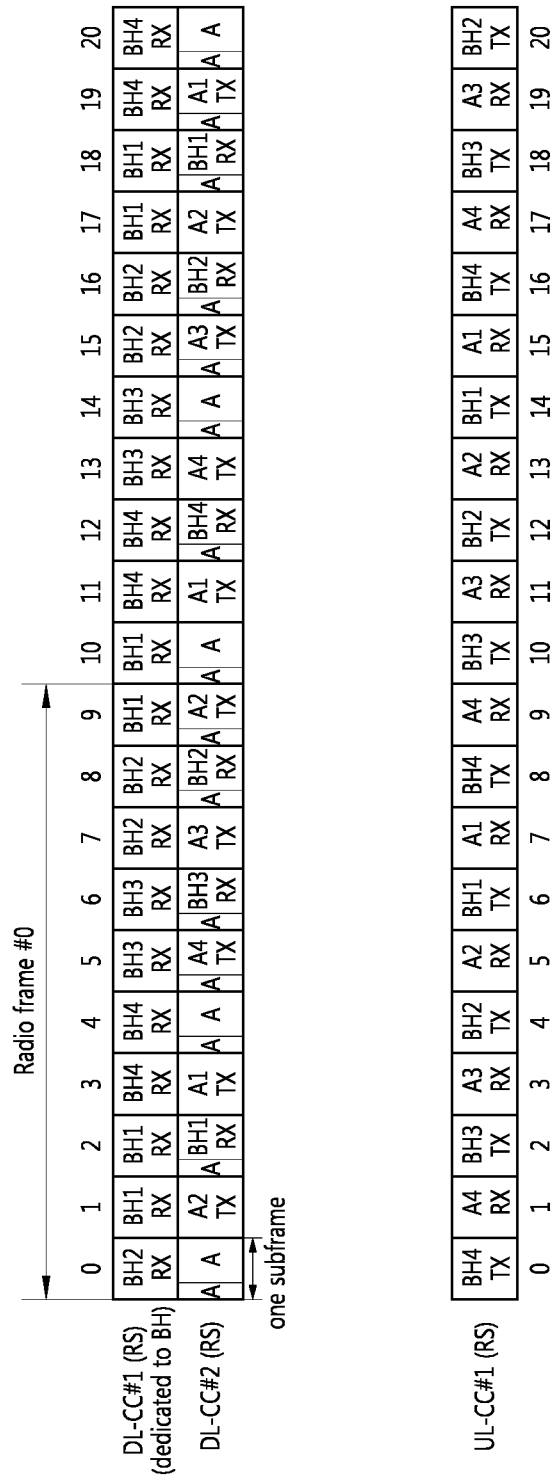
FIG. 17 is a fourth embodiment showing an operation in a subframe of each carrier when using a DL-CC#1 as a primary carrier in a third embodiment.

FIG. 17 is a fourth embodiment showing an operation in a subframe of each carrier when using a DL-CC#1 as a primary carrier in the third embodiment.

A BS can transmit a B-DL signal in all subframes through the DL-CC#1. That is, an RS can receive the B-DL signal in all subframes of the DL-CC#1. A case where four HARQ processes are performed in one radio frame of the DL-CC#1 is exemplified in FIG. 17. For example, an HARQ process 1 can be performed in subframes 1, 9, and 17 or subframe 2, 10, and 18 of the DL-CC#1, and an HARQ process 2 can be performed in subframes 3, 11, and 19 or in subframes 4, 12, and 20. Likewise, the HARQ processes 3 and 4 can be performed with a period of 8 subframes.

In addition, in a DL-CC#2, the RS can secondarily or additionally receive a B-DL signal in a subframe having an even subframe index other than subframes having subframe indices 0, 4, 5, and 9. The B-DL signal received in the subframe of the DL-CC#2 may relate to an HARQ process performed in a subframe of the DL-CC#1 having the same subframe index. That is, a B-DL signal received in the subframe 2 of the DL-CC#2 relates to an HARQ process performed in the subframe 2 of the DL-CC#1.

The RS can receive a B-DL signal by using the same PDCCH and PDSCH formats as those used in a UE through the DL-CC#1, and can receive a B-DL signal by using R-PDCCH and R-PDSCH formats different from those used in the UE through the DL-CC#2.

Figure 18:
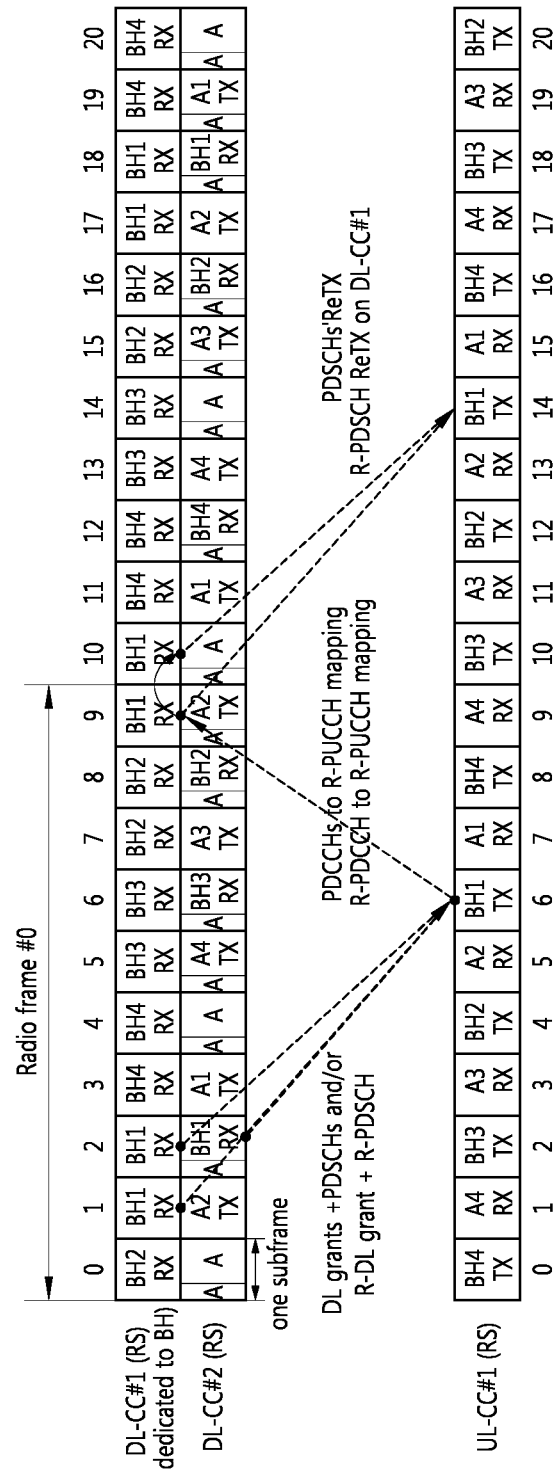
FIG. 18 shows a method of performing a B-DL HARQ in a fourth embodiment.

FIG. 18 shows a method of performing a B-DL HARQ in the fourth embodiment.

Referring to FIG. 18, an RS can receive a DL grant and B-DL data respectively in subframes 1 and 2 of a DL-CC#1 through a radio resource indicated the DL grant. In addition, the RS can receive B-DL data in a subframe 2 of a DL-CC#2. In the DL-CC#1, B-DL data can be received through a PDSCH having the same format as that used in the UE. In the DL-CC#2, B-DL data can be received through an R-PDSCH used in the RS.

The RS transmits ACK/NACK for the B-DL data in a subframe 6 of the UL-CC#1. In this case, ACK/NACK can be transmitted through the R-PUCCH. Herein, a radio resource by which ACK/NACK is transmitted on the R-PUCCH can be determined according to a radio resource of a PDCCH received in the DL-CC#1. For example, a radio resource for allocating the ACK/NACK transmitted on the R-PUCCH can be determined based on a CCE index of the PDCCH. In addition, a radio resource used for transmission of ACK/NACK on the R-PUCCH can be determined according to a radio resource of the R-PDCCH received in the DL-CC#2.

In a subframe 9 of the DL-CC#1, a BS can retransmit B-DL data of a subframe 1 of the DL-CC#1 or can transmit new B-DL data. In addition, in a subframe 10 of the DL-CC#1, B-DL data of the subframe 2 of the DL-CC#1 can be retransmitted or new B-DL data can be transmitted. In the subframe 9 or 10 of the DL-CC#1, B-DL data transmitted in the subframe 2 of the DL-CC#2 can be retransmitted.

Figure 19:
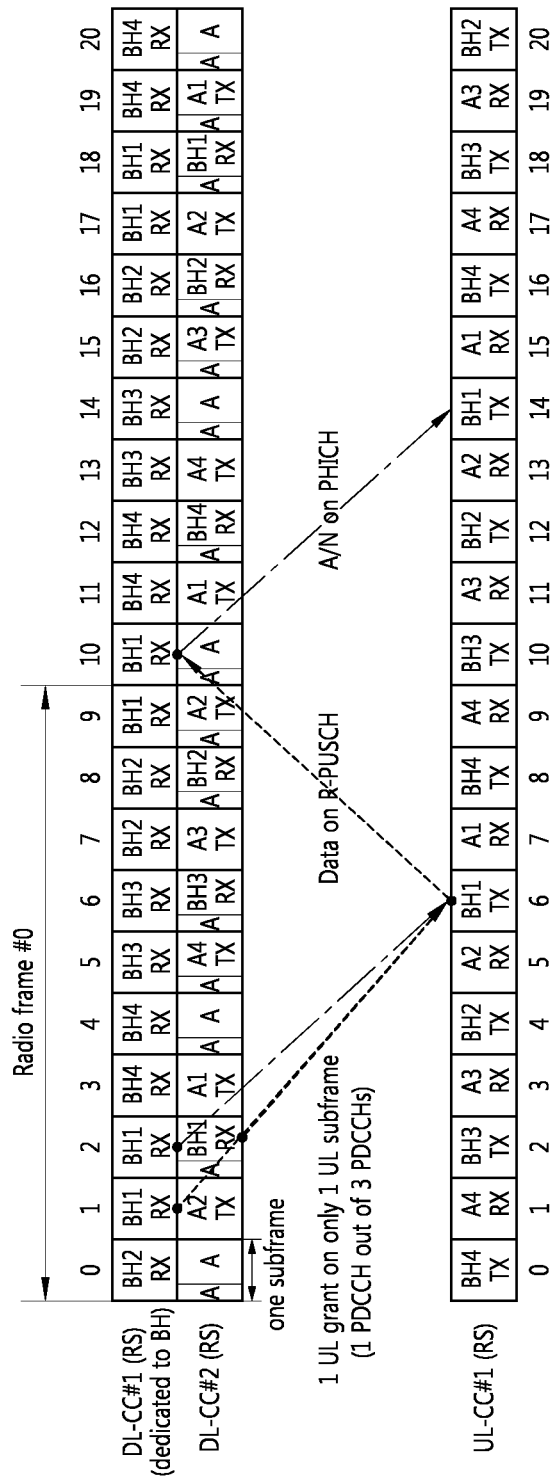
FIG. 19 shows a method of performing a B-UL HARQ in a fourth embodiment.

FIG. 19 shows a method of performing a B-UL HARQ in the fourth embodiment.

Referring to FIG. 19, an RS can receive the same UL grant from a plurality of subframes that participate in the same HARQ process. For example, the same UL grant can be received from subframes 1 and 2 of a DL-CC#1 and a subframe 2 of a DL-CC#2 when the subframes participate in an HARQ process 1 (i.e., BH 1).

In this case, the UL grant can indicate a subframe of a UL-CC#1, that is, a subframe (n+5) or (n+4), with respect to a subframe n of the DL-CC#1. In the above example, a radio resource of a subframe 6 of the UL-CC#1 can be determined from the UL grant. That is, the RS transmits B-UL data to a BS through an R-PUSCH of the subframe 6 of the UL-CC#1.

Alternatively, among the plurality of subframes participating in the same HARQ process, the UL grant can be received only from any one subframe included in a DL carrier dedicated to a backhaul link.

The BS can transmit ACK/NACK through a PHICH of a subframe 10 of the DL-CC#1. In this case, even if the BS transmits ACK/NACK in the subframe 10 of the DL-CC#2, it cannot be received by the RS. Therefore, the BS does not transmit ACK/NACK in the subframe 10 of the DL-CC#2.

Figure 20:
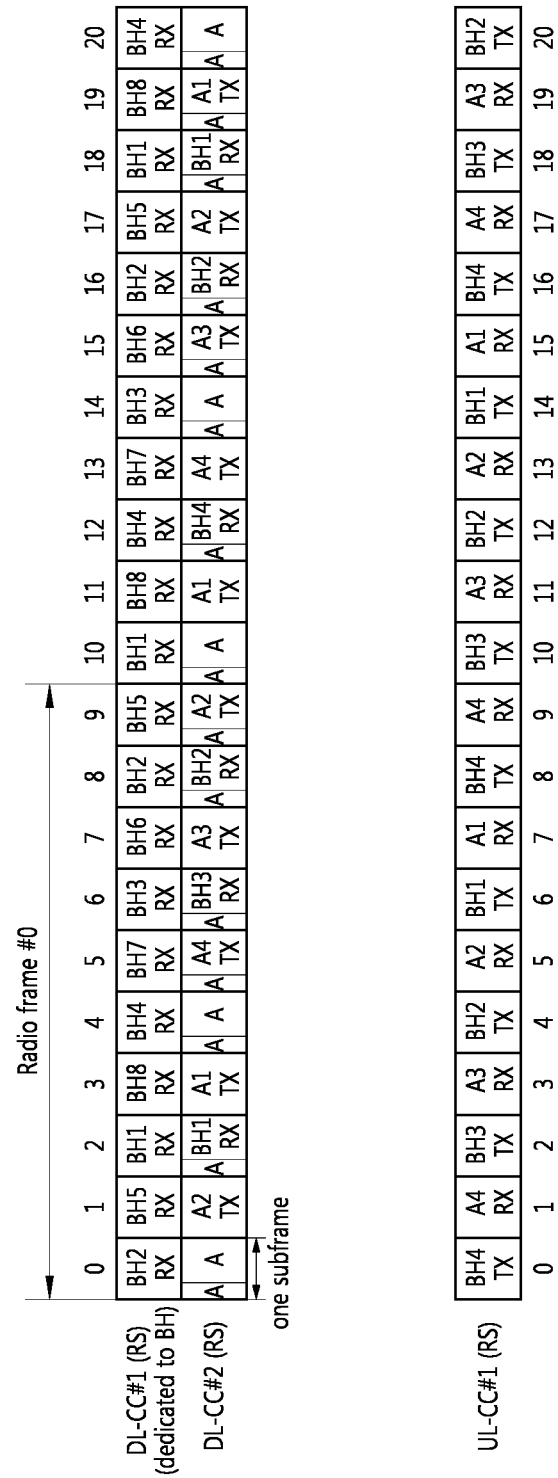
FIG. 20 is a fifth embodiment showing an operation of a subframe of each carrier when a DL-CC#1 is used as a primary carrier in a third embodiment.

FIG. 20 is a fifth embodiment showing an operation of a subframe of each carrier when a DL-CC#1 is used as a primary carrier in the third embodiment.

In comparison with the fourth embodiment of FIG. 17, the embodiment of FIG. 20 is different in that 8 HARQ processes are performed in a DL-CC#1. For example, an HARQ process 1 is performed in subframes 2, 10, and 18 of the DL-CC#1 and an HARQ process 2 is performed in subframes 0, 8, and 16. In addition, in a DL-CC#2, an RS can secondarily or additionally receive a B-DL signal in a subframe having an even subframe index other than subframes having subframe indices 0, 4, 5, and 9. The B-DL signal received in the subframe of the DL-CC#2 may relate to an HARQ process performed in a subframe of the DL-CC#1 having the same subframe index.

The RS can receive a B-DL signal by using the same PDCCH and PDSCH formats as those used in a UE through the DL-CC#1, and can receive a B-DL signal by using R-PDCCH and R-PDSCH formats different from those used in the UE through the DL-CC#2.

Figure 21:
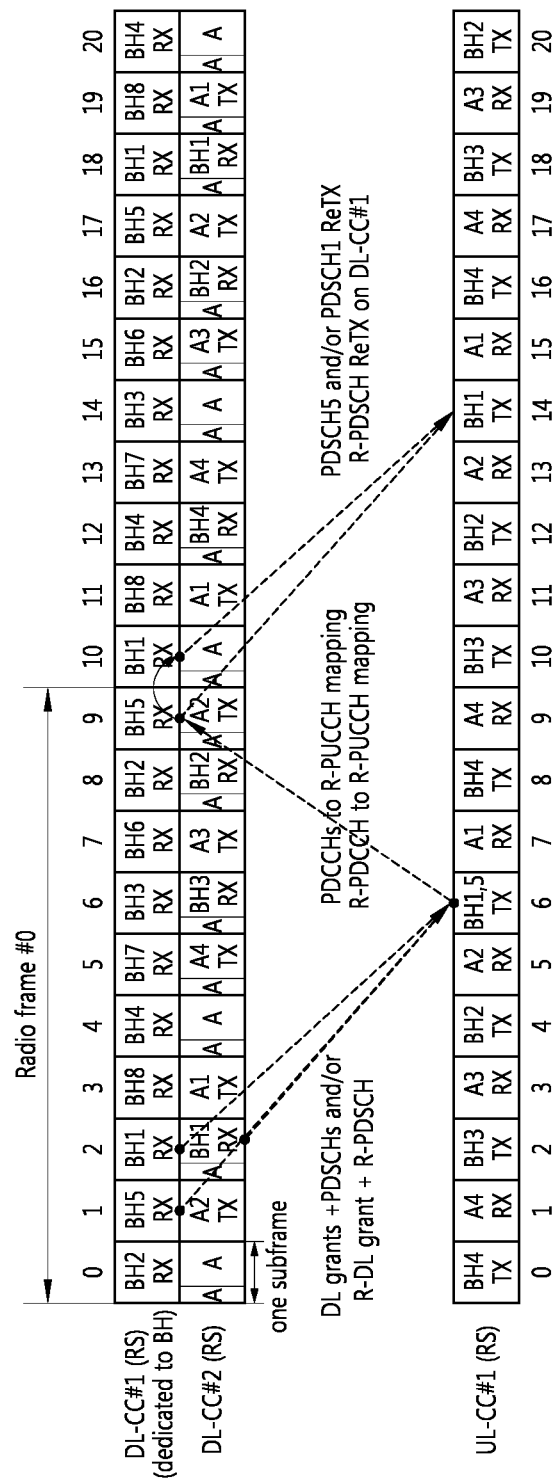
FIG. 21 shows a method of performing a B-DL HARQ in a fifth embodiment.

FIG. 21 shows a method of performing a B-DL HARQ in the fifth embodiment.

Referring to FIG. 21, an RS can receive a DL grant and B-DL data respectively in subframes 1 and 2 of a DL-CC#1 through a radio resource indicated the DL grant. In this case, unlike FIG. 18, B-DL data transmitted in the subframe 1 and B-DL data transmitted in the subframe 2 may be data related to a different HARQ process. In addition, the RS can receive B-DL data in a subframe 2 of a DL-CC#2. In the DL-CC#1, B-DL data can be received in the DL-CC#1 through a PDSCH having the same format as that used in the UE. In the DL-CC#2, B-DL data can be received through an R-PDSCH used in the RS.

The RS transmits ACK/NACK for the B-DL data in a subframe 6 of the UL-CC#1. In this case, ACK/NACK can be transmitted through the R-PUCCH. Herein, a radio resource by which ACK/NACK is transmitted on the R-PUCCH can be determined according to a radio resource of a PDCCH received in the DL-CC#1. For example, a radio resource for allocating the ACK/NACK transmitted on the R-PUCCH can be determined based on a CCE index of the PDCCH. In addition, a radio resource used for transmission of ACK/NACK on the R-PUCCH can be determined according to a radio resource of the R-PDCCH received in the DL-CC#2.

In a subframe 9 of the DL-CC#1, a BS can retransmit B-DL data of a subframe 1 of the DL-CC#1 or can transmit new B-DL data. In addition, in a subframe 10 of the DL-CC#1, B-DL data of the subframe 2 of the DL-CC#1 can be retransmitted or new B-DL data can be transmitted. In the subframe 9 or 10 of the DL-CC#1, B-DL data transmitted in the subframe 2 of the DL-CC#2 can be retransmitted.

Figure 22:
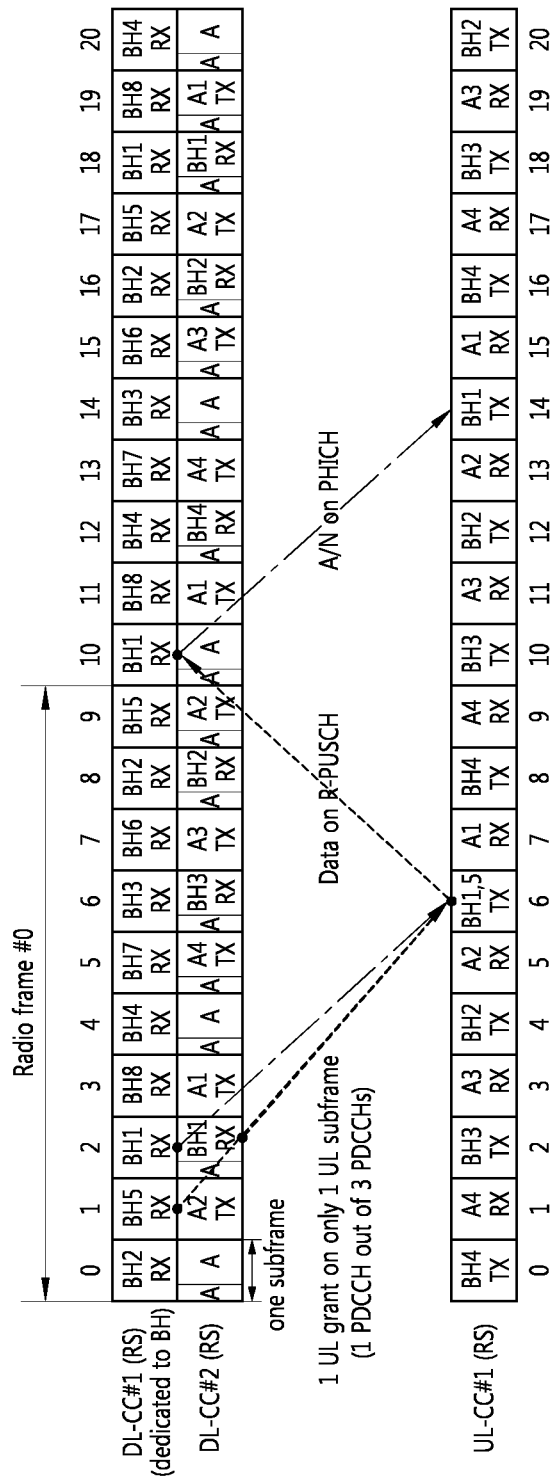
FIG. 22 shows a method of performing a B-UL HARQ in a fifth embodiment.

FIG. 22 shows a method of performing a B-UL HARQ in the fifth embodiment.

In comparison with FIG. 19, the method of FIG. 22 is different in that the number of HARQ processes performed in a DL-CC#1 is 8. That is, the number of HARQ processes performed in a DL CC dedicated to a backhaul link can change variously in the present invention.

Figure 23:
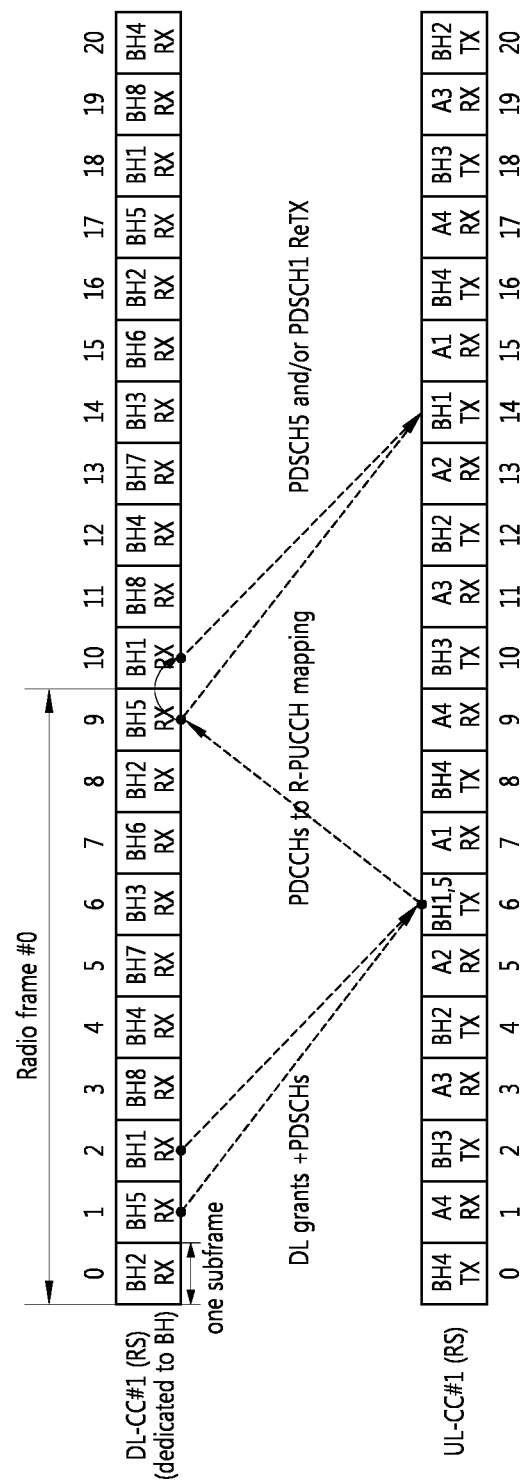
FIG. 23 shows a method of performing a B-DL HARQ when using one backhaul-dedicated CC in a B-DL and using a UL carrier in a B-UL and an access uplink (A-UL) in a TDM manner.

FIG. 23 shows a method of performing a B-DL HARQ when using one backhaul-dedicated CC in a B-DL and using a UL carrier in a B-UL and an A-UL in a TDM manner.

Referring to FIG. 23, an RS can transmit ACK/NACK in a subframe (n+4) or (n+5) of a UL-CC#1 when a subframe index of a DL-CC#1 in which B-DL data is received is n. The RS can transmit ACK/NACK for B-DL data, which is received in a plurality of subframes of the DL-CC#1, through a UL-CC#1 by performing bundling or multiplexing.

For example, the RS receives B-DL data for an HARQ process 5 in a subframe 1 of the DL-CC#1 dedicated to a backhaul link, and receives B-DL data for an HARQ process 1 in a subframe 2. In this case, ACK/NACK for the subframes 1 and 2 of the DL-CC#1 is transmitted in a subframe 6 of the UL-CC#1. That is, ACK/NACK can be transmitted by performing bundling or multiplexing in one subframe, used in the backhaul link, having an even subframe index.

Figure 24:
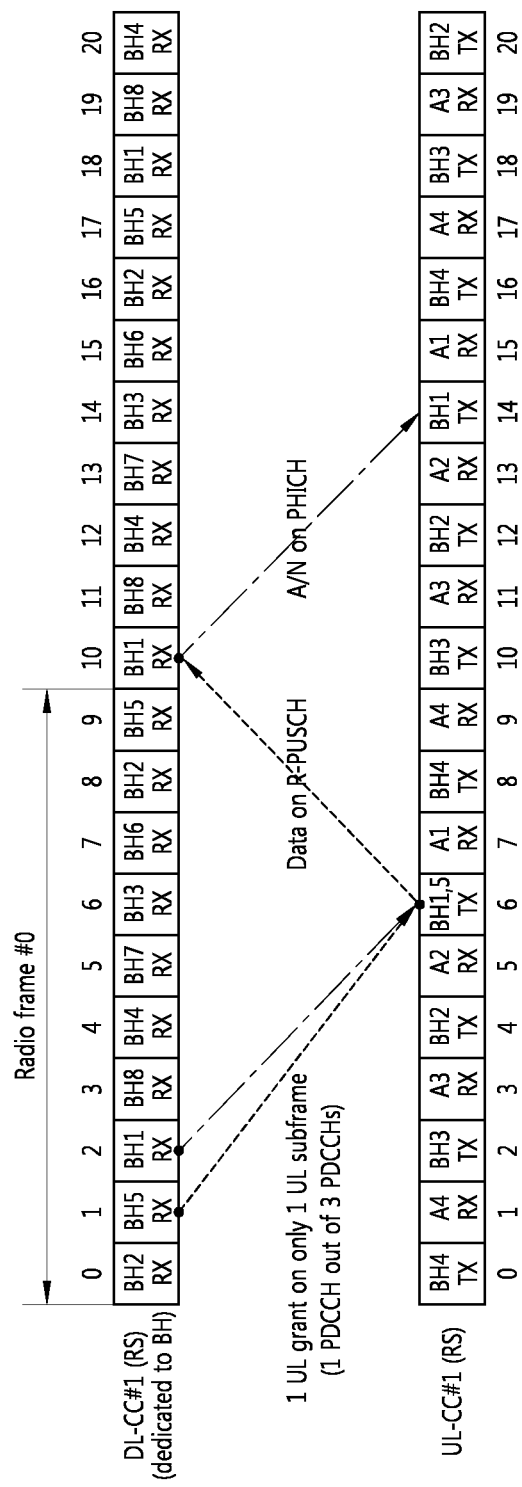
FIG. 24 shows a method of performing a B-UL HARQ when using one backhaul-dedicated CC in a B-DL and using a UL carrier in a B-UL and an A-UL in a TDM manner.

FIG. 24 shows a method of performing a B-UL HARQ when using one backhaul-dedicated CC in a B-DL and using a UL carrier in a B-UL and an A-UL in a TDM manner.

Referring to FIG. 24, an RS can transmit B-UL data in a subframe (n+4) or (n+5) of a UL-CC#1 when receiving a UL grant in a subframe n of a DL-CC#1. That is, the RS can receive a UL grant indicating same subframe of the UL-CC#1 in a plurality of subframes of the DL-CC#1. The RS transmits B-UL data in the subframe of the UL-CC#1 indicated by the received UL grant. Further, ACK/NACK can be received from the DL-CC#1 after four subframes elapse from a subframe index at which B-UL data is transmitted.

For example, the RS receives a UL grant for an HARQ process 5 in a subframe 1 of a DL-CC#1 dedicated to a backhaul link, and receives a UL grant for an HARQ process 1 in a subframe 2. In this case, the UL grant can indicate same subframe 6 of the UL-CC#1. The RS can transmit B-UL data for the HARQ processes 1 and 5 in the subframe 6 of the UL-CC#1. Further, ACK/NACK for the B-UL data can be received through a PHICH of a subframe 10 of the DL-CC#1.

Figure 25:
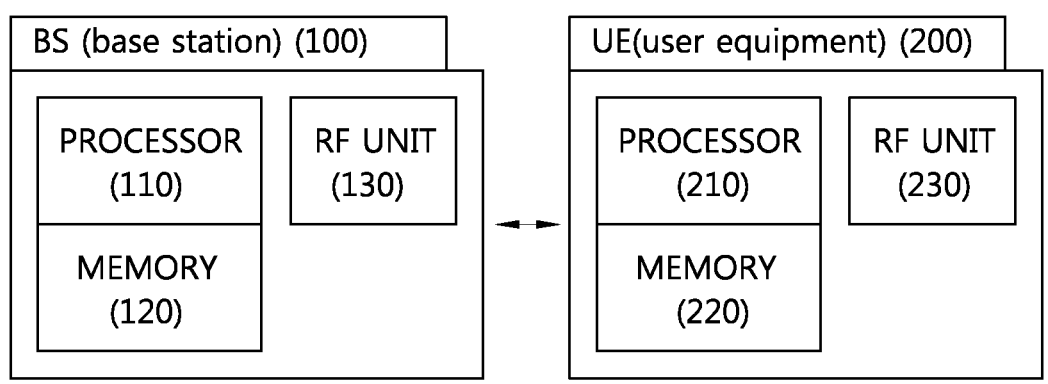
FIG. 25 is a block diagram showing a base station and a relay station.

FIG. 25 is a block diagram showing a BS and an RS.

A BS 100 includes a processor 110, a memory 120, and a radio frequency (RF) unit 130. The processor 110 implements the proposed functions, procedures, and/or methods. The memory 120 coupled to the processor 110 stores a variety of information for driving the processor 110. The RF unit 130 coupled to the processor 110 transmits and/or receives a radio signal.

An RS 200 includes a processor 210, a memory 220, and an RF unit 230. The processor 210 receives a backhaul link signal through at least one of a backhaul-dedicated carrier dedicated to a backhaul link and a general purpose carrier used in the backhaul link and an access link, and transmits ACK/NACK for the backhaul link signal or B-UL data through a UL CC. In addition, according to the transmitted ACK/NACK, new B-DL data or to-be-retransmitted B-DL data is received through at least one carrier between the backhaul-dedicated carrier and the general-purpose carrier. Alternatively, ACK/NACK for the B-UL data is received through at least one carrier between the backhaul-dedicated carrier and the general purpose carrier.

The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The OFDM transmitter and OFDM receiver of FIG. 7 can be implemented in the processors 110 and 210. The memories 120 and 220 may include a read-only memory (ROM), a random access memory (RAM), a flash memory, a memory card, a storage medium, and/or other equivalent storage devices. The RF units 130 and 230 may include one or more antenna ports for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing a hybrid automatic repeat request (HARQ) of a relay station in a backhaul link of a multi-carrier system, the method comprising:

receiving backhaul downlink data through at least one carrier between a first carrier and a second carrier;

transmitting acknowledgement/not-acknowledgement (ACK/NACK) for the backhaul downlink data through an uplink component carrier; and receiving new backhaul downlink data or retransmitted backhaul downlink data in accordance with the transmitted ACK/NACK through at least one carrier between the first carrier and the second carrier, wherein the first carrier is a component carrier dedicated to the backhaul downlink between a base station and the relay station, and the second carrier is a component carrier used in both the backhaul downlink and an access downlink between the relay station and a relay user equipment at different times.

2. The method of claim 1, wherein the first carrier and the second carrier have different frequency bands.

3. The method of claim 1, wherein when receiving the backhaul downlink data, the new backhaul downlink data, or the retransmitted backhaul downlink data, the data is received through the second carrier in a subframe of which a subframe index is an even number and is not 0, 4, 5, and 9 in a radio frame.

4. The method of claim 1, wherein when the backhaul downlink data, the new backhaul downlink data, or the retransmitted backhaul downlink data needs to be received in a subframe of which a subframe index is 0, 4, 5, and 9 in a radio frame, the data is received through the first carrier.

5. The method of claim 1, wherein when receiving the backhaul downlink data in a subframe n (where n is an integer greater than or equal to 0), the ACK/NACK is transmitted in a subframe (n+4), and the new backhaul downlink data or the retransmitted backhaul downlink data is received in a subframe (n+8).

6. The method of claim 1, wherein when the backhaul downlink data is received from the first carrier and the second carrier, if the backhaul downlink data received from the first carrier and the backhaul downlink data received from the second carrier are both successfully received, ACK is transmitted as the ACK/NACK, and otherwise, NACK is transmitted.

7. The method of claim 1, wherein when receiving the backhaul downlink data from the first carrier and the second carrier, the ACK/NACK is transmitted after performing multiplexing in such a manner that ACK/NACK for the backhaul downlink data received from the first carrier and ACK/NACK for the backhaul downlink data received from the second carrier are allocated to different radio resources.

8. The method of claim 1, wherein the relay station receives the backhaul downlink data through the first carrier secondarily for a subframe in which backhaul downlink data cannot be received through the second carrier.

9. The method of claim 1, wherein the relay station receives backhaul downlink data through the first carrier, and receives backhaul downlink data through the second carrier additionally for a subframe of which a subframe index is an even number and is not 0, 4, 5, and 9.

10. The method of claim 1, wherein the uplink component carrier is a component carrier which is used in both a backhaul uplink between the base station and the relation state and an access uplink between the relay station and the relay user equipment at different times.

11. The method of claim 10, wherein the uplink component carrier is used in the backhaul uplink in a subframe of which a subframe index is an even number in a radio frame, and is used in the access uplink in a subframe of which a subframe index is an odd number.

12. A method of performing an HARQ of a relay station in a backhaul link of a multi-carrier system, the method comprising:

receiving a backhaul uplink grant through at least one carrier between a first carrier and a second carrier;

transmitting backhaul uplink data through an uplink component carrier by using a radio resource allocated in the backhaul uplink grant;

receiving ACK/NACK for the backhaul uplink data through at least one carrier between the first carrier and the second carrier; and transmitting the backhaul uplink data or new backhaul uplink data in accordance with the received ACK/NACK through the uplink component carrier, wherein the first carrier is a component carrier dedicated to a backhaul downlink and the second carrier is a component carrier used in both the backhaul downlink and an access downlink between the relay station and a relay user equipment at different times.

13. The method of claim 12, wherein if the ACK/NACK is received in a subframe of which a subframe index is 0, 4, 5, and 9, the ACK/NACK is received through the first carrier.

14. A relay station used in a multi-carrier system, comprising:

a radio frequency (RF) unit for transmitting and receiving a radio signal; and a processor coupled to the RF unit, wherein the processor is configured for: receiving backhaul downlink data through at least one carrier between a first carrier and a second carrier; transmitting ACK/NACK for the backhaul downlink data through an uplink component carrier; and receiving new backhaul downlink data or retransmitted backhaul downlink data in accordance with the transmitted ACK/NACK through at least one carrier between the first carrier and the second carrier, wherein the first carrier is a component carrier dedicated to the backhaul downlink between a base station and the relay station, and the second carrier is a component carrier used in both the backhaul downlink and an access downlink between the relay station and a relay user equipment at different times.

* * * * *